United States Patent
Chatterton et al.

(10) Patent No.: US 10,499,338 B2
(45) Date of Patent: Dec. 3, 2019

(54) SYSTEM CONFIGURATIONS BASED ON TILT DETECTION

(71) Applicant: PAYPAL, INC., San Jose, CA (US)

(72) Inventors: Geoffrey W. Chatterton, Santa Clara, CA (US); Satish Narayan Govindarajan, Los Altos, CA (US); Akshay Sanjeevaiah Krishnaiah, San Jose, CA (US); Guhan Senguttuvan, San Jose, CA (US); Gunabalan Babu, San Jose, CA (US); Carlos Rivas, Redwood City, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 16/019,213

(22) Filed: Jun. 26, 2018

(65) Prior Publication Data
US 2019/0007907 A1    Jan. 3, 2019

Related U.S. Application Data

(63) Continuation of application No. 15/174,536, filed on Jun. 6, 2016, now Pat. No. 10,009,847.

(60) Provisional application No. 62/257,209, filed on Nov. 18, 2015.

(51) Int. Cl.
*H04W 52/02* (2009.01)
*H04W 8/22* (2009.01)
*H04M 1/725* (2006.01)
*H04W 8/00* (2009.01)

(52) U.S. Cl.
CPC ... *H04W 52/0254* (2013.01); *H04M 1/72519* (2013.01); *H04W 8/22* (2013.01); *H04W 52/0225* (2013.01); *H04M 2250/12* (2013.01); *H04W 8/005* (2013.01); *Y02D 70/00* (2018.01); *Y02D 70/1242* (2018.01); *Y02D 70/1262* (2018.01); *Y02D 70/142* (2018.01); *Y02D 70/144* (2018.01); *Y02D 70/146* (2018.01);

(Continued)

(58) Field of Classification Search
CPC .............. H04W 52/0254; H04W 8/22; H04W 52/0225; H04W 8/005; H04M 1/72519; H04M 2250/12; Y02D 70/142; Y02D 70/00; Y02D 70/166; Y02D 70/1262; Y02D 70/146; Y02D 70/144; Y02D 70/1242; Y02D 70/164; Y02D 70/26
See application file for complete search history.

(56) References Cited

U.S. PATENT DOCUMENTS

| 10,009,847 B2 * | 6/2018 | Chatterton | ........ H04W 52/0254 |
| 2011/0171909 A1 * | 7/2011 | Jung | .................... H04W 48/16 455/41.2 |

(Continued)

*Primary Examiner* — Marisol Figueroa
(74) *Attorney, Agent, or Firm* — Haynes and Boone, LLP

(57) ABSTRACT

Various systems, mediums, and methods herein describe a computing system that includes a tilt sensor and a transceiver. The system is configured to determine one or more tilts of the system detected by the tilt sensor. The system is also configured to determine a scan interval and a rest interval based on the one or more tilts detected. The system is also configured to provide scanning power to cause a transceiver of the system to scan an environment for one or more signals of interest based on the scan interval and the rest interval. As such, the one or more signals may be identified from the scan of the environment.

20 Claims, 19 Drawing Sheets

(52) U.S. Cl.
CPC .......... *Y02D 70/164* (2018.01); *Y02D 70/166* (2018.01); *Y02D 70/26* (2018.01)

(56) References Cited

U.S. PATENT DOCUMENTS

| | | | |
|---|---|---|---|
| 2014/0148131 A1* | 5/2014 | Kholaif | H04W 12/06 |
| | | | 455/411 |
| 2014/0341069 A1* | 11/2014 | Alon | H04W 48/16 |
| | | | 370/254 |
| 2015/0249908 A1* | 9/2015 | Le | G08B 19/00 |
| | | | 455/414.1 |
| 2016/0117660 A1* | 4/2016 | Prakash | H04W 4/70 |
| | | | 705/14.64 |
| 2016/0140404 A1* | 5/2016 | Rosen | H04W 8/22 |
| | | | 455/456.3 |
| 2018/0260029 A1* | 9/2018 | Birnbaum | H04W 4/21 |

* cited by examiner

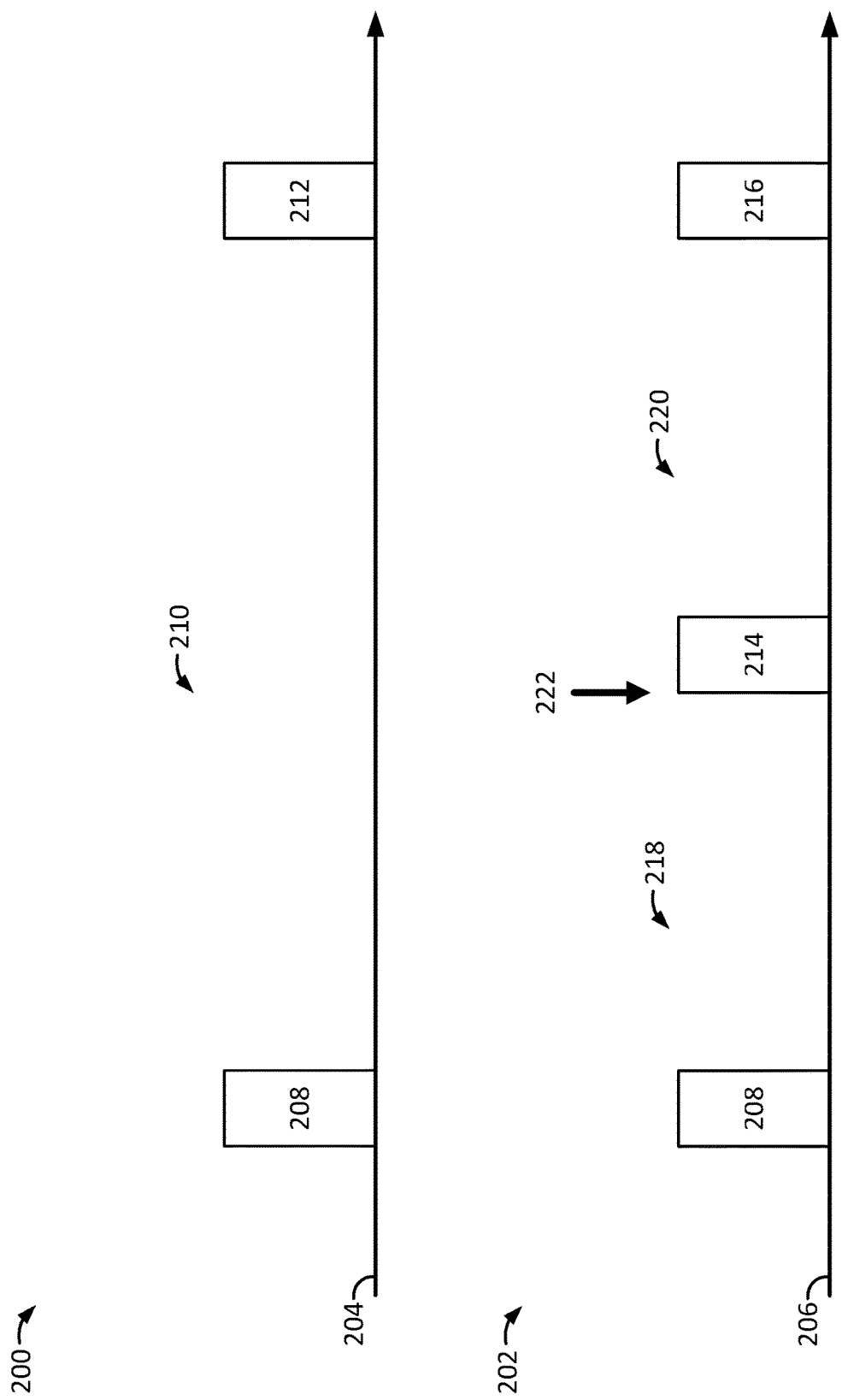

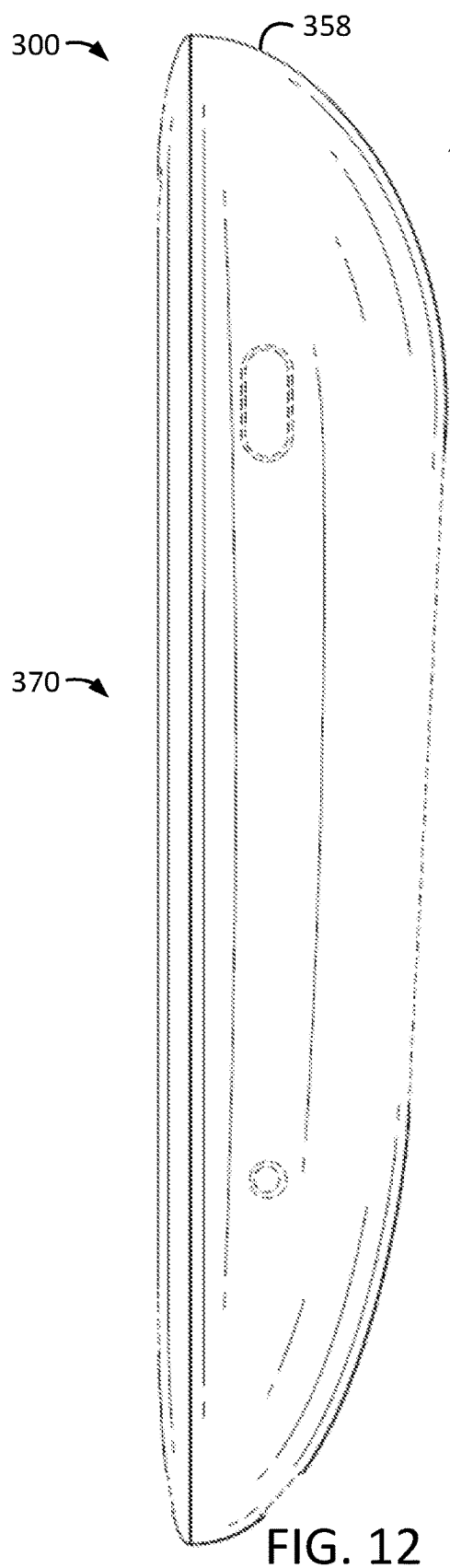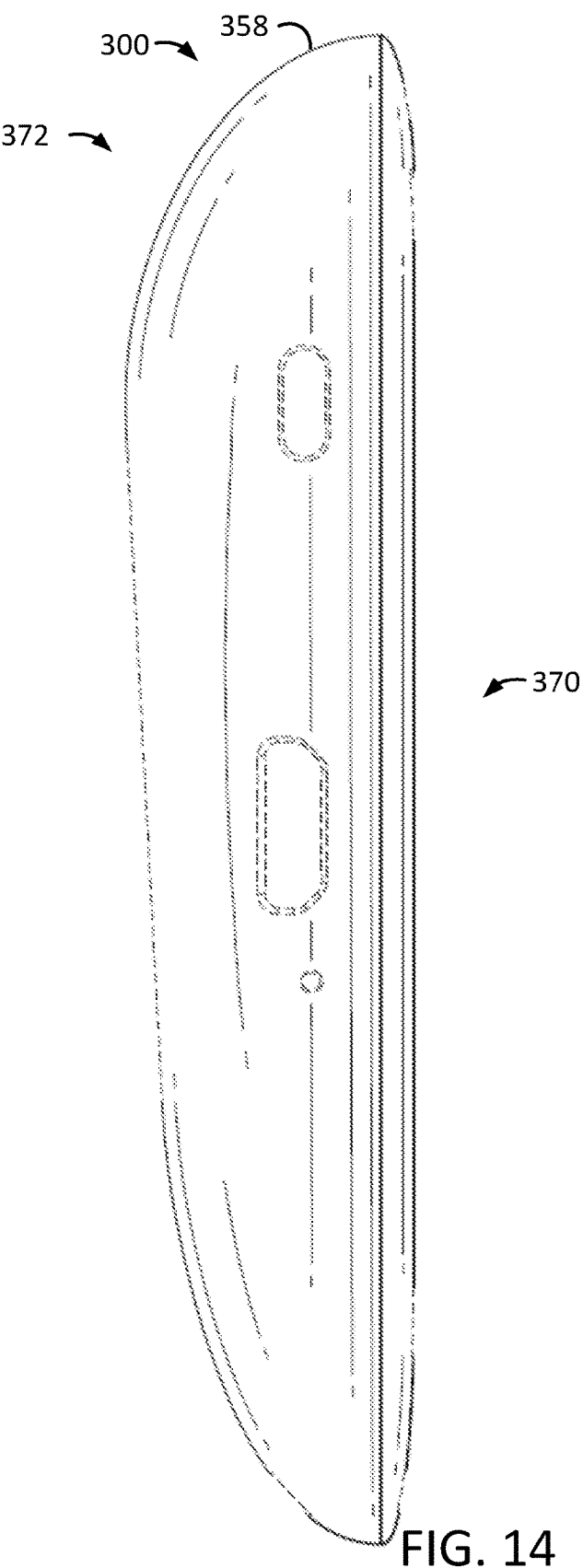
FIG. 12
FIG. 14

SYSTEM CONFIGURATIONS BASED ON TILT DETECTION

CROSS-REFERENCE TO RELATED APPLICATIONS

This continuation patent application claims priority to and the benefit of U.S. patent application Ser. No. 15/174,536, filed Jun. 6, 2016, and issued on Jun. 26, 2018 as U.S. Pat. No. 10,009,847 which claims priority to U.S. Provisional Patent App. No. 62/257,209 entitled "Power Management Based on Tilt Detection," filed on Nov. 18, 2015, the entireties of which is herein incorporated by reference.

BACKGROUND

Computing devices are becoming increasingly more prevalent in the modern world. In particular, it is not uncommon for a single user to own more than one mobile device or possibly utilize multiple devices throughout their daily lives. For example, a single user may own a smartphone device to manage their personal contacts and communications. Further, the user may operate a laptop computer or a desktop computer in a work environment. Yet further, the user may also own or operate a tablet computer in their home, possibly for a home entertainment system, among other possibilities.

As users become increasingly more dependent on their mobile devices, the users may also become increasingly more reliant on the batteries of their mobile devices. For example, it may be undesirable to a user to have to charge their mobile device more than once a day. Yet further, in some instances, it may be undesirable to have to charge the mobile device more than once in a few days or in a week, possibly depending on the usage of the device. Notably, a mobile device with a shorter battery life may leave users unsatisfied as they may face various inconveniences. For example, a user may be forced to regularly carry a charger to help ensure that the mobile device may be charged when the battery level of the device becomes lower than the level that is desired. Further, the user may be forced to look for charging stations on a frequent basis to charge the device, among other inconvenient scenarios possibly related to regularly changing the battery of the device.

In various respects, designers of such mobile devices often face several challenges in developing architectures that may optimize the battery life of a mobile device. For example, improving the battery life of a mobile device may be costly, particularly if the architecture requires more board space, circuitry, and/or hardware components. Further, improving the battery life of the mobile device may compromise other aspects of the mobile device, possibly creating design and/or technical issues, thereby delaying time to market. As such, there may be several challenges to optimizing the power management of the mobile device.

As demonstrated above, there is much need for technological advancements in various aspects of mobile device architectures and related technologies associated with managing the power of a mobile device.

BRIEF DESCRIPTION OF THE DRAWINGS

FIG. 2A illustrates timing diagrams, according to multiple embodiments;

FIG. 12 is a right side view of the exemplary system embodying the new design;

FIG. 14 is a left side view of the exemplary system embodying the new design;

Figure 1A:
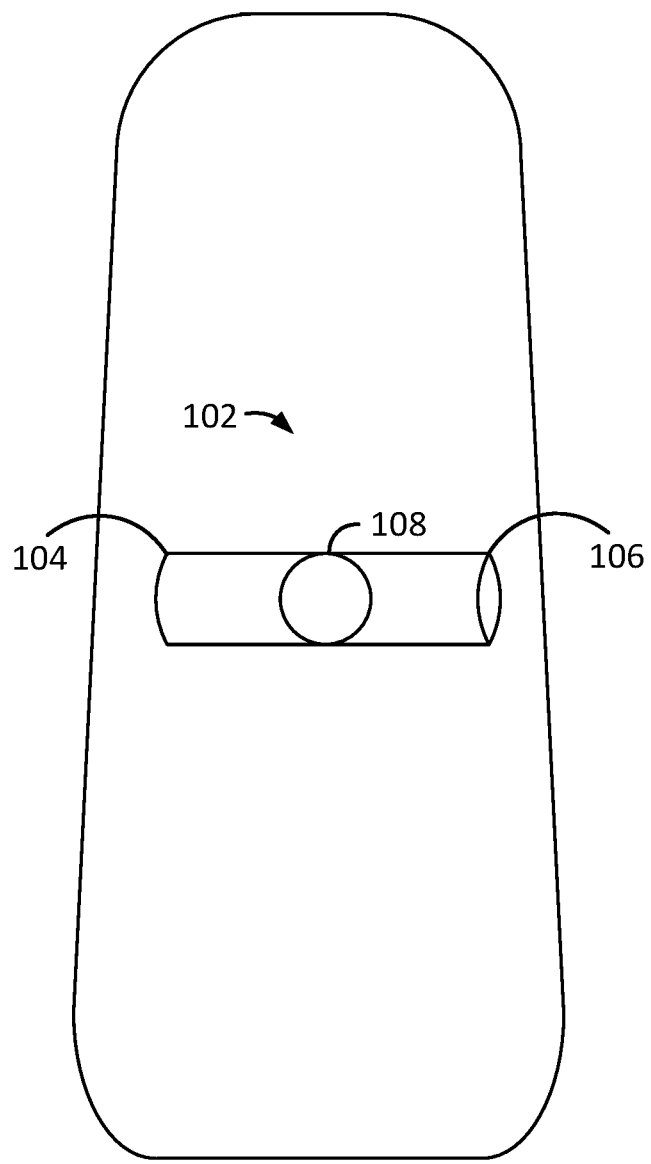
FIG. 1A illustrates an exemplary system, according to an embodiment.

Embodiments of the present disclosure and their advantages may be understood by referring to the detailed description herein. It should be appreciated that reference numerals may be used to illustrate various elements provided in the figures. Further, the figures may illustrate various examples for purposes of illustration and explanation related to the embodiments of the present disclosure and should not be interpreted to be limiting.

DETAILED DESCRIPTION

Example embodiments described herein provide various aspects of mobile device architectures and related technologies associated with preserving the power of a mobile device. In practice, consider a scenario where a user is in possession of a mobile device, e.g., a smartphone device or a key fob device. The user may be in a moving vehicle or in some instances, the user may be riding a motorcycle or a bicycle. Further, consider the mobile device includes a tilt sensor, a small, low-power component configured to sense one or more tilts of the mobile device, including various orientations, inclinations, angles, and/or gradients of the mobile device. For example, the mobile device may tilt, slope, and/or slant based on the movements of the vehicle or the user. As such, the tilt sensor may detect the user is in a moving car.

In some instances, the mobile device may detect various types of movements based on the tilt sensor, possibly utilizing the tilt sensor coupled with other components of the mobile device, as described herein. For example, the mobile device may detect a number of tilts, a degree of each tilt, a number of tilts that meet or exceed a tilt threshold, duration of tilts, and/or a number of tilt patterns based on the tilts detected, possibly associated with the moving vehicle described above. In some instances, the tilt sensor, possibly coupled with other components of the mobile device, may indicate a varying and/or fluctuating tilt of the mobile device based on the acceleration of the moving vehicle. As such, the tilt sensor, possibly coupled with the other components, may also indicate a velocity, an acceleration, a g-force, and/or a number of vibrations detected based on various types of movements of the mobile device and/or the moving vehicle, among a number of other possibilities. Notably, by determining such types of movements, the mobile device may determine user activities associated with the mobile device.

In some instances, the mobile device may manage and/or preserve power associated with scanning for signals of interest, such as wireless signals, beacon signals, signals that may include short-wavelength radio waves in approximately the 2.4 to 2.485 GHz range, among other types of possible signals of interest. As such, the signals of interest described herein should not be interpreted in any limiting way as they may include various types of wireless signals, communication signals, and/or electromagnetic waves. In some instances, the mobile device may terminate the scanning power by terminating scanning operations to help preserve the power levels of the mobile device. For example, terminating the scanning power may intelligently preserve power of the mobile device where the user may not be interested in scanning for the signals described above. For instance, considering the scenarios above, the user is probably not interested in scanning for signals in the areas that the moving vehicle passes as it moves. As such, the mobile device may terminate the scanning operations to preserve power in the mobile device. In yet another instance, the tilt sensor may be used to determine the mobile device has stayed in a given area (e.g., the mobile device has not moved) or has been moved to an area and/or an environment without any signals of interest. As such, the mobile device may terminate the scanning operations to preserve power in the mobile device.

Further considering the scenarios above, the mobile device may detect the vehicle has come to a stop, possibly based on one or more tilts detected by the tilt sensor. As such, the user may exit the vehicle and begin walking, possibly to go to a coffee shop. In such circumstances, the tilt sensor, possibly coupled with other components, may detect various types of tilts described above including, for example, one or more tilts associated with the user getting out of the vehicle carrying the mobile device and walking to the coffee shop. In particular, the tilt sensor may detect multiple tilts and/or patterns of tilts associated with the mobile device, possibly alternating and/or swinging tilts associated with the user's steps and/or strides. Further, the tilt sensor, possibly coupled with other components, may also detect an absence of such tilts based on the user arriving at the coffee shop. In various such circumstances, the mobile device may initiate scanning power to cause the mobile device to scan for one or more signals of interest, such as one or more beacon signals in the coffee shop environment, possibly as the user walks towards the coffee shop and/or arrives at the coffee shop. For example, the mobile device may detect the beacon and identify the beacon is configured to enable the purchase of a cup of coffee.

Considering the scenarios above, the mobile device may connect with a remote server in the backend infrastructure based on one or more signals of interest, such as the beacon signals detected at the coffee shop. As such, the mobile device may complete a transaction to purchase the cup of coffee by connecting with the remote server. In particular, the mobile device may determine one or more tokens to complete the transaction. In some instances, each token may correspond to a particular payment instrument or a payment account, such as a payment account associated with PayPal, Inc. of San Jose, Calif., USA. As such, the user may select a desired token displayed by the mobile device to complete the transaction. Notably, in some instances, the user may complete the transaction offline and update the user account at another time, possibly after establishing a connection with the remote server.

It should be noted that one or more tilt sensors may have a number of advantages over other components, such as conventional accelerometers, gyroscopes, and/or orientation sensors. For example, the tilt sensor is a low or zero power sensor, device, and/or instrument configured to detect tilts of the mobile device while also preserving power of the mobile device. Further, the tilt sensor may, in some instances, be smaller than the conventional components described above to save space, e.g., board space, in the mobile device. Yet further, the tilt sensor provides a high level of durability, particularly with being impermeable and resistant to wearing out. For example, the tilt sensors described herein may have lifetimes of detecting numerous tilts without degradation in detection quality. In addition, the tilt sensor may be an inexpensive component to help lower the costs of components to manufacture the mobile device.

FIG. 1A illustrates an exemplary system 100, according to an embodiment. As shown, the system 100, possibly referred to a mobile system 100, may take the form of a key fob device. Yet, the mobile system 100 may take the form of other devices as well. For example, the mobile system 100 may also take the form a smartphone device, a personal computer, a tablet computer, and/or a wearable computing device, among other possible computing devices.

As shown, the mobile system 100 includes a tilt sensor 102. The tilt sensor 102 may be cylindrical in shape with one end portion 104 and another end portion 106. For example, the tilt sensor 102 may have an approximate 2-6 millimeter diameter and approximately a 10-14 millimeter length. Further, the tilt sensor 102 may include an object 108 configured to move between the end portion 104 and the end portion 106. The object 108 may be a conductive mass, such as a rolling ball and/or a blob of a dense substance, such as mercury. As such, the position of the object 108 at the end portion 104 or at the end portion 106 may be detected to indicate one or more tilts of the mobile device 100.

It should be noted that the tilt sensor 102, the end portions 104 and 106, and the object 108 are provided for purposes of illustration and explanation. As such, the tilt sensor 102 shown in FIG. 1A and possibly the other figures throughout this disclosure may be enlarged for explanatory purposes. Thus, the illustrations and the explanations should not be taken as limiting. For example, the tilt sensor 103 may take a number of other shapes and further, the tilt sensor 102 may not include the object 108 to detect one or more tilts of the computing system 100. In particular, the tilts may be detected by other means as described or contemplated herein with other types of components.

Figure 1B:
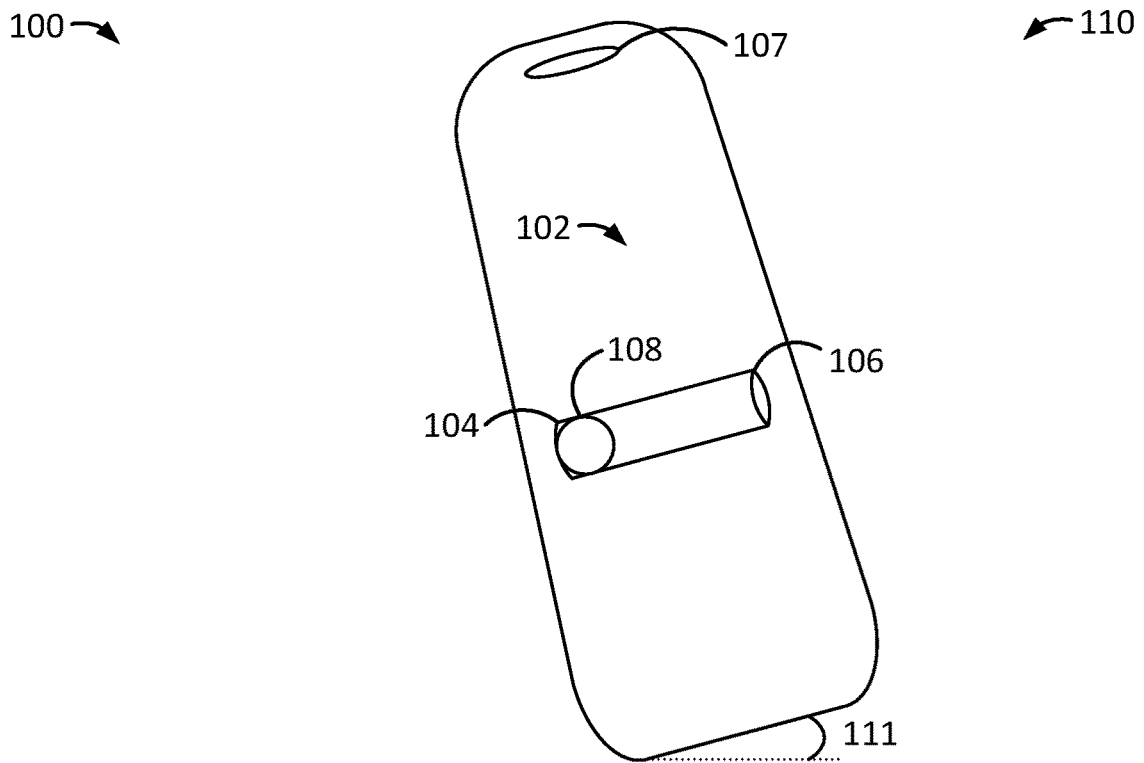
FIG. 1B illustrates one or more tilts associated with an exemplary system, according to an embodiment.

FIG. 1B illustrates one or more tilt 110 associated with an exemplary system 100, according to an embodiment. As shown, the mobile system 100 may include a hole 107 configured to attach and suspend from a ring and/or a keychain ring. As such, in some instance, the system 100 may take the form of a key fob device, possibly hanging from the keychain ring, among other types of devices contemplated herein. Further, as shown, the one or more tilts 110 of the system 100 may cause the object 108 to move to the end portion 104, possibly based on one or more forces, such as gravity, inertia, centripetal forces, among other types of forces associated with the system 100. Notably, the end portion 104 may include two poles such that the position of the object 108 at the end portion 104 may electrically connect the two poles, thereby acting as a switch. As such, the one or more tilts 110 of the mobile system 100 may be detected accordingly.

Figure 1C:
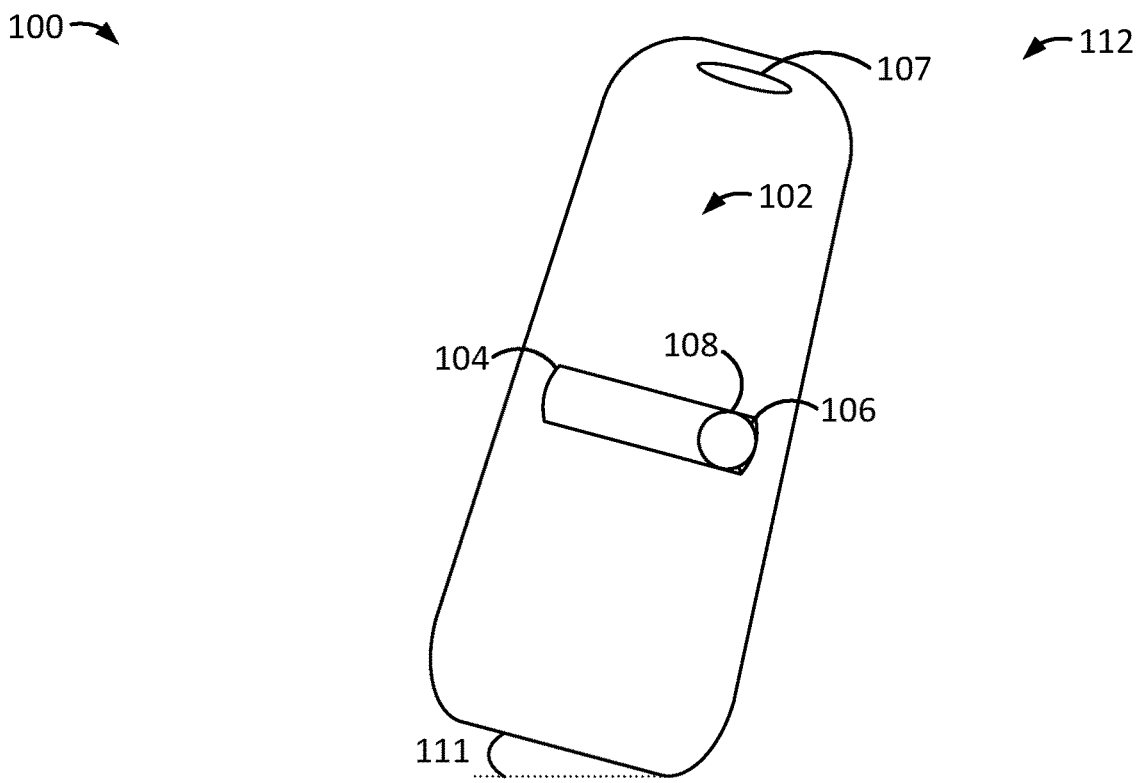
FIG. 1C illustrates one or more other tilts associated with an exemplary system, according to an embodiment.

FIG. 1C illustrates one or more other tilts 112 associated with an exemplary system 100, according to an embodiment. As shown, the hole 107 may be attached to the ring and/or the keychain ring discussed above. As such, the one or more other tilts 112 of the system 100 may cause the object 108 to move to the end portion 106, also possibly based on the one or more forces described above, such as gravity, inertia, centripetal forces, among other types of forces associated with the system 100. Notably, the end portion 106 may also include two poles such that the position of the object 108 at the end portion 106 may electrically connect the two poles, thereby acting as a switch. As such, the one or more tilts 112 of the mobile system 100 may be detected accordingly.

As noted, the tilt sensor 102 may detect a degree 111 of one or more tilts 110 and/or 112. For example, the tilt sensor 102, the object 108, and/or the end portions 104 and/or 106 may have conductive properties such that the position of the object 108 between the end portions 104 and 106 may vary a measurable capacitance. For instance, one or more of the end portions 104 and 106 may include a component, such as a capacitor, that indicates a varying capacitance based on the given position of the object 110 between the end portions 104 and 106. As such, the degree 111 of one or more tilts 110 and/or 112 may be measured to indicate a velocity, an acceleration, and/or a g-force of the mobile system 100, among the other forces of the system 100 contemplated herein.

For example, considering the scenarios above, the degree 111 of the tilt 110 and/or 112 may vary or fluctuate between 10 and 15 degrees, among other possible ranges, corresponding to the velocity and/or the acceleration of the moving vehicle carrying the mobile system 100. As noted, the system 100 may take the form of a key fob device hanging from an area and/or or a module (e.g., the ignition, the dashboard, and/or console) within the moving vehicle. As such, the system 100 may determine and/or detect that it is being transported in the moving vehicle, thereby terminating scanning operations and scanning power, as described above. Further, the mobile system 100 may determine the vehicle has stopped and initiate the scanning power to resume scanning operations accordingly and perform a scan of the environment, in accordance with various operations described above.

In another example, a number of tilts 110 and/or 112 may be detected to meet or exceed a tilt threshold. For example, a series of the tilts 110 and 112 may include the tilt 110 followed by the tilt 112, and the tilt 112 followed by the tilt 110, and so on until the tilt threshold is met or exceeded. In some instances, meeting or exceeding the tilt threshold may indicate the user in possession of the mobile system 100 is walking in a given direction. In particular, the series of tilts 110 and/or 112 may correspond to steps and/or strides of the user walking, possibly if the system 100 takes the form the key fob device described above, possibly hanging on the user's clothing, for example. As such, considering the scenarios above, the mobile system 100 may provide scanning power to perform one or more scans of the environment. In addition, the mobile system 100 may also detect an absence of the tilts 110 and/or 112 to determine the user has arrived at a given destination, such as the coffee shop described above. As such, the mobile system 100 may provide the scanning power to perform the one or more scans, possibly to detect a signal of interest. As noted, the system 100 may detect the beacon signal at the coffee shop that enables the user to get cup of coffee with the mobile system 100.

Figure 1D:
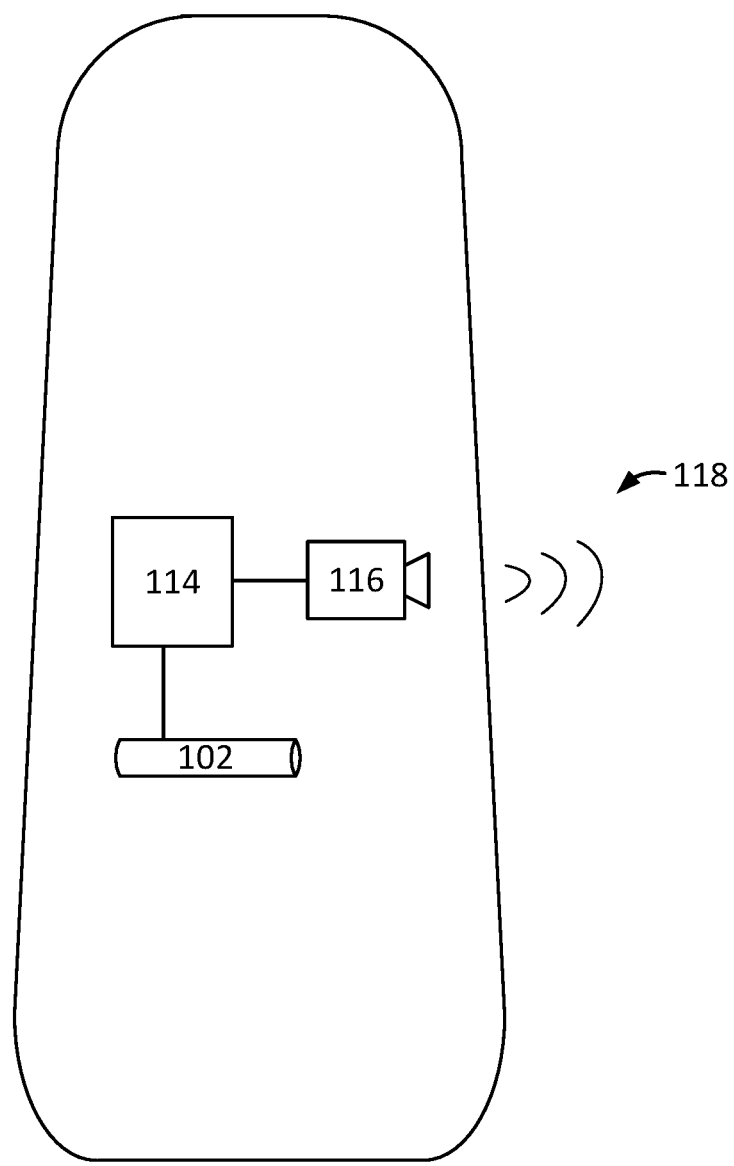
FIG. 1D illustrates an exemplary system, according to an embodiment.

FIG. 1D illustrates an exemplary system 100, according to an embodiment. As shown, the mobile system 100 may also include one or more processors 114 coupled to the tilt sensor 102. Further, the processor 116 may be coupled to the transceiver 116 with a connection, such as a universal asynchronous receiver/transmitter (UART) and/or a serial peripheral interface (SPI) connection. The processor 114 may interpret the pattern of tilt events and/or the degree 111 of one or more of the tilts 110 and/or 112 to determine the mobile system 100 is in a moving vehicle, and/or possibly sitting on the user's counter, among other possibilities.

As such, the processor 114 may terminate scanning power to the transceiver 116. Yet further, the processor 114 may determine the number of tilts 110 and/or 112 described above meets or exceeds a tilt threshold to determine the mobile system 100 is in the possession of a user walking to a particular destination, as described above. In addition, the processor 114 may determine that the user that has reached the destination, possibly based on absence of the tilts 110 and/or 122 detected. In various such circumstances, the processor 114 may provide scanning power to cause the transceiver 116 to scan 118 an environment of the mobile system 100 for one or more signals of interest described above.

Figure 1E:
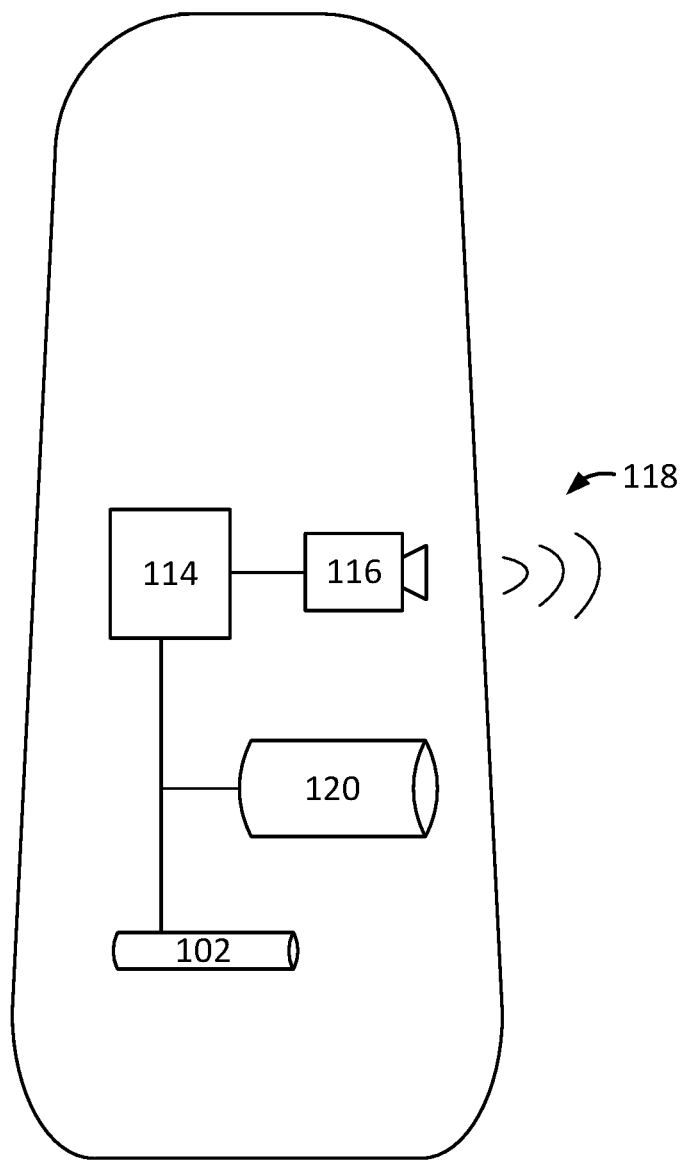
FIG. 1E illustrates an exemplary system, according to an embodiment.

FIG. 1E illustrates an exemplary system 100, according to an embodiment. As shown, the mobile system 100 includes the processor 114 coupled to the tilt sensor 102. Further, the processor 114 is coupled to the transceiver 116 with a connection, such as the UART and/or SPI connection. Yet further, the processor 114 may be coupled to an accelerometer 120, possibly also including an inclinometer. In some instances, the processor 114 may detect motion based on tilt switch activity and then decide to activate and/or enable the accelerometer 120 to provide additional movement data. This additional movement data may be interpreted to indicate speeds and/or velocities of the mobile system 100. For example, referring back to the scenarios above, the movement data may indicate speeds of the moving vehicle carrying the mobile system 100 ranging from 5 to 65 miles per hour, or possibly other ranges as well. Further, the movement data may indicate changes in such speeds, the rate of change in the speeds (e.g., the coordinate acceleration), and/or speed thresholds that may be exceeded. As such, the processor 114 may determine the mobile system 100 is in a moving vehicle or a stationary vehicle, possibly terminating the scanning power accordingly.

The accelerometer 120 may also provide movement data that indicates the proper acceleration, e.g., the g-force, of the mobile system 100. The movement data may also indicate the magnitude and the direction of the acceleration, possibly as a vector quantity. Further, the movement data may indicate various orientations of the mobile system 100 based on possible movement changes, vibrations, and/or shocks, possibly due to the user carrying the mobile system 100 while walking, as described above. The accelerometer 120 may take a variety of different forms such as a micro electro-mechanical system (MEMS), including a cantilever beam with a proof mass, also possibly referred to a seismic mass. In particular, the accelerations may be detected based on the proof mass deflecting from a neutral position in the accelerometer 120. In such instances, the deflections may be measured in analog or digital movement data.

In some embodiments, the processor 114 may activate or enable the accelerometer 120 based on a number of detections. As noted, the processor 114 may activate or enable the accelerometer 120 based on the one or more tilts 110 and/or 112 detected by the tilt sensor 102. Further, the one or more tilts 110 and/or 112 may act as a gating function and/or a trigger to provide the motion detecting power that activates the accelerometer 120. In some instances, additional circuitry may be activated to read the movement data from the accelerometer 120. As such, the accelerometer 120 may provide movement data indicating the mobile system 100 is moving in the moving vehicle, the system 100 is being carried by the user walking to the coffee shop, and/or the system 100 is attached to the user's clothing as the user is going for a jog, among other possible scenarios. As such, the processor 114 may determine various activities of the user based on the movement data from the accelerometer 120, possibly activities where movement data from the accelerometer 120 may not be necessary. Thus, the processor 114 may terminate the movement detection power to power down the accelerometer 120 and conserve power in the system 100 accordingly.

FIG. 2A illustrates timing diagrams 200 and 202, according to multiple embodiments. As shown, the timing diagram 200 includes a timeline 204 with a scan interval 208, a rest interval 210, and a scan interval 212, possibly associated with a passive mode (e.g., a passive scan mode) of the mobile system 100 described above. In some instances, the scan intervals 208 and/or 210 may each be time intervals of approximately five seconds in which the mobile system 100 provides scanning power to cause the transceiver 116 to scan an environment for one or more signals of interest, such as the beacon signals described above. Further, the rest interval 210 may be a time interval of approximately sixty seconds in which mobile system 100 terminates the scanning power, possibly to conserve power of the mobile system 100. As such, the scan interval 208 of approximately five seconds and rest interval 210 of approximately sixty seconds may reflect an approximate seven to eight percent duty cycle, among other possibilities.

As also shown, the timing diagram 202 includes a timeline 206 with the scan interval 208 described above, a rest interval 218, a scan interval 214, a rest interval 220, and a scan interval 216, possibly associated with an active mode (e.g., an active scan mode) of the mobile system 100 described above. In some instances, the scan intervals 208, 214, and/or 216 may each be time intervals of approximately five seconds in which the mobile system 100 provides scanning power to initiate scanning operations and cause the transceiver 116 to scan an environment. Further, the rest intervals 218 and/or 220 may be time intervals of approximately thirty seconds in which mobile system 100 terminates the scanning power and the scanning operations, possibly to conserve power of the mobile system 100. As such, the scan interval 208 of approximately five seconds and rest interval 218 of approximately thirty seconds may reflect a fourteen to fifteen percent duty cycle, among other possibilities.

As noted, referring back to FIGS. 1A-1E, the mobile system 100 includes the tilt sensor 102, one or more of the processors 114, and the transceiver 116. In one embodiment, the mobile system 100 also includes a non-transitory memory. As such, the one or more processors 114 may be coupled to the non-transitory memory and configured to read instructions from the non-transitory memory to cause the mobile system 100 to perform operations. The operations may include determining one or more tilts 110 and/or 112 of the computing system 100 detected by the tilt sensor 102. Notably, various patterns of the tilts 110 and/or 112 may also be determined.

Further, the operations may include determining the scan intervals 208, 214, and/or 216 and the rest intervals 218 and/or 220 based on the one or more tilts 110 and/or 112 of the mobile system 100 detected. For example, based on the one or more tilts 110 and/or 112, the system 100 may enter the active scan mode described above. Yet further, the operations may include providing scanning power to initiate scanning operations and cause the transceiver 116 to scan 118 an environment of mobile system 100, possibly to identify one or more signals of interest (e.g., beacon signals) based on the scan intervals 208, 214, and/or 216, and the rest intervals 218 and/or 220. In addition, the operations may include identifying the one or more signals of interest and/or the beacon signals from the scan 118 of the environment.

In some embodiments, the operations may include terminating the scanning power based on the one or more signals of interest identified. Yet, it should be noted that the operations may include determining that the one or more signals of interest, such as the beacon signals, are not identified in the environment. For example, the one or more beacon signals may not be identified from the scan 118 made during the scan intervals 208, 214, and/or 216. As such, the operations may include terminating the scan power and the scanning operations based on the one or more beacons not identified.

Yet further, in some embodiments, the mobile system 100 may identify the signals of interest from the scan 118 made during the scan intervals 208, 214, and/or 216. In some instances, the mobile system 100 may perform additional scans based on one or more beacons identified from the scan 118. For example, the operations described above may also include the mobile system 100 providing the scanning power to initiate the scanning operations and causing the transceiver 116 to further scan the environment for one or more additional beacons based on the one or more beacons identified from the scan 118. In particular, the one or more beacons identified from the scan 118 may not include a particular beacon that the user may be interested in. As such, the transceiver 116 may further scan the environment for the one or more additional beacons. Further, the system 100 may terminate the scanning power and the scanning operations based on a completion of the scan 118 for the one or more additional beacons to preserve power in the system 100.

In some embodiments, the mobile system 100 may receive user inputs. For example, the operations of the mobile system 100 described above may include receiving one or more user inputs from a user interface of the mobile system 100, possibly instructing the mobile system 100 to initiate a scan. Further, the mobile system 100 may receive one or more user inputs that indicate the user is not interested in one or more of the signals and/or beacons already identified from a previous scan. As such, the mobile system 100 may provide the scanning power to initiate scanning operation and cause the transceiver 116 to further scan the environment for one or more additional signals of interest based on one or more user inputs. Notably, the one or more user inputs received may also instruct the mobile system 100 to terminate the scanning power. As such, the mobile system 100 may terminate the scanning power and the scanning operations based on the one or more user inputs received.

In some embodiments, the mobile system 100 may determine a signal of interest, such as a recognized signal and/or a beacon. For example, the operations of the mobile system 100 described above may include determining a recognized signal from the one or more signals identified based on the scan 118. In particular, the recognized signal may correspond to scan data, e.g., signal and/or beacon data, stored by the mobile system 100. For example, the scan data may have been stored based on prior scans and prior signals and/or beacons identified. Further, the mobile system 100 may terminate the scanning power and the scanning operations based on the recognized beacon. Considering the scenarios above, for instance, the recognized beacon may be associated with the coffee shop such that the user may purchase the cup of coffee. As such, the mobile system 100 may terminate the scanning power based on the recognized beacon identified from the coffee shop.

Referring back to FIGS. 1A-1E, the mobile system 100 may activate the accelerometer 120, possibly based on the one or more tilts 110 and/or 112 detected by the tilt sensor 102. For example, the operations of the mobile system 100 described above may include providing movement detection power to initiate movement detection operations and activate the accelerometer 120 accordingly. As such, the mobile system 100 may retrieve movement data from the accelerometer 120. As noted, the movement data may correspond to various types of movements of the mobile system 100 detected by the accelerometer 120. In some instances, the operations may include determining the movement of the mobile system 100 meets or exceeds a movement threshold based on the movement data and/or the one or more tilts 110 and/or 112. Considering the scenarios above, for instance, the mobile system 100 may determine the movement meets or exceeds a speed threshold of five to ten miles per hour, possibly indicating the user is in a moving vehicle or is riding a bicycle. As noted, the scanning power may be terminated since the user is likely not interested in beacons in areas the user passes in the moving vehicle. Further, the operations may include terminating the movement detection power based on the movement determined that meets or exceeds the movement threshold to preserve power in the mobile system 100.

In some instances, the scan interval 208 and the rest interval 210 may be determined by the mobile system 100 based on meeting or exceeding the movement threshold described above. For example, the mobile system 100 may enter the passive mode, described above as the passive scan mode, to perform the scan 118. As such, the mobile system 100 may provide the scanning power to initiate scanning operations and cause the transceiver 116 to scan 118 the environment based on the scan intervals 208 and/or 212, and the rest interval 210. Thus, the power in the mobile system 100 may be preserved accordingly.

In some embodiments, the mobile system 100 may determine a user activity. For example, the operations of the mobile system 100 described above may include providing movement detection power to initiate movement detection operations to retrieve movement data from the accelerometer 120. As noted, the movement data may correspond to various movements of the mobile system 100 detected by the accelerometer 120. As such, the operations may include determining a user activity, such as the user sitting, standing, talking, eating, walking, and/or jogging, among other possible activities. Yet further, a given state of the mobile system 100 may also be determined. For example, it may be determined that the mobile system 100 is in a stationary state, possibly sitting on the user's counter. As such, various user activities and/or states associated with the mobile system 100 may be determined based on the movement data. Thus, the movement detection power may be terminated once the user activity is determined. For example, the system 100 may determine low or no user activity based on the system 100 detecting a stationary state on the user's counter. As such, the movement detection power may be terminated accordingly.

In some instances, the scan intervals 208, 214, and/or 216 and the rest intervals 218 and/or 220 in the timing diagram 202 may be determined by the mobile system 100 based on the user activity determined. For example, the mobile system 100 may enter an active mode to perform the scan 118, possibly based on the user activity determined. As such, the mobile system 100 may provide the scanning power to initiate scanning operations and cause the transceiver 116 to scan 118 the environment based on the scan intervals 208, 214, and/or 216 and the rest intervals 218 and/or 220.

Figure 2B:
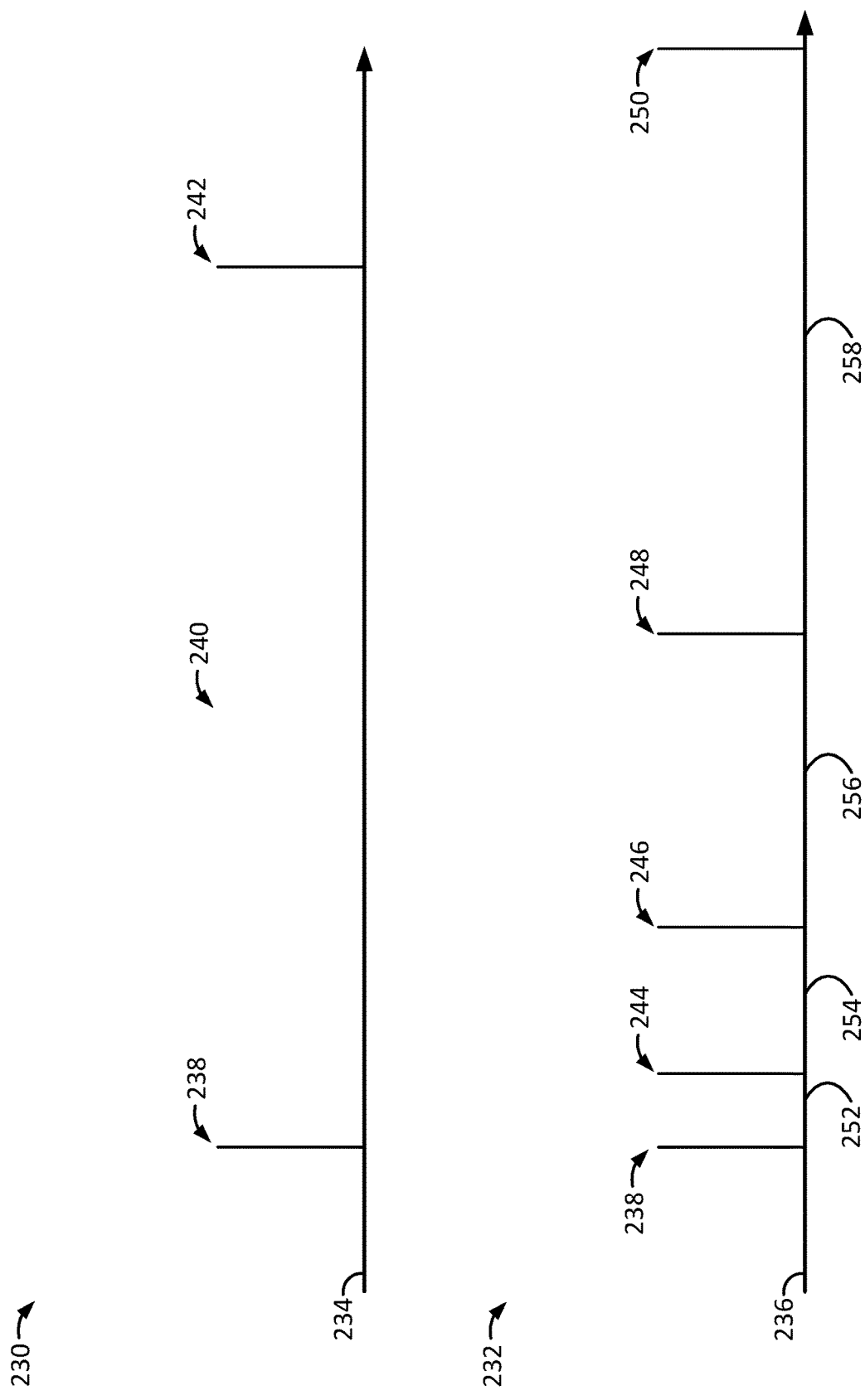
FIG. 2B illustrates timing diagrams, according to multiple embodiments.

FIG. 2B illustrates timing diagrams 230 and 232, according to multiple embodiments. As shown, the timing diagram 230 includes a timeline 234 with a scan 238, a rest interval 240, and a scan 242, possibly associated with a passive mode of the mobile system 100, as described above. In particular, the scan 238 may correspond to the scan interval 208 and the scan 242 may correspond to the scan interval 212 described above in relation to FIG. 2A.

As such, the scans 238 and/or 242 may each correspond to time intervals of approximately five seconds in which the mobile system 100 provides scanning power to initiate scanning operations and cause the transceiver 116 to scan the environment. Further, the rest interval 240 may be a time interval of approximately sixty seconds in which mobile system 100 terminates the scanning power, possibly to conserve power of the mobile system 100.

As shown, the timing diagram 232 includes a timeline 236 with the scan 238, a rest interval 252, a scan 244, a rest interval 254, a scan 246, a rest interval 256, a scan 248, a rest interval 258, and a scan 250, possibly associated with the passive mode, referred to as the passive scan mode above, and/or a back-off scan mode of the mobile system 100.

As noted, the timing diagram 232 includes the scan 238 from the timing diagram 230. Further, the scans 244, 246, 248, and/or 250 may be similar to the scan 238, possibly also corresponding to the scan intervals 208 and/or 212 described above in relation to FIG. 2B. Yet, the rest intervals 252, 254, 256, and/or 258 may each illustrate an exponential growth on the timeline 236. For example, the time interval 254 may be exponentially longer than the time interval 252. Further, the time interval 256 may be exponentially longer than the time interval 254. Yet further, the time interval 258 may be exponentially longer than the time interval 256, and so on.

In some embodiments, the operations of the mobile system 100 described above may include determining the number of scans 238, 244, 246, 248, and/or 250. Further, a number of rest intervals 252, 254, 256, and/or 258 may also be determined, possibly based on the one or more signals of interest identified from the scan 118. As noted, each subsequent rest interval from the number of rest intervals 252, 254, 256, and/or 258 may be exponentially longer than its previous rest interval. As such, the operations may also include providing scanning power to initiate scanning operations and cause the transceiver 116 to scan 118 the environment based the number of scans 238, 244, 246, 248, and/or 250, and the number of rest intervals 252, 254, 256, and/or 258. As such, the power of the mobile system 100 may be preserved accordingly.

Figure 3A:
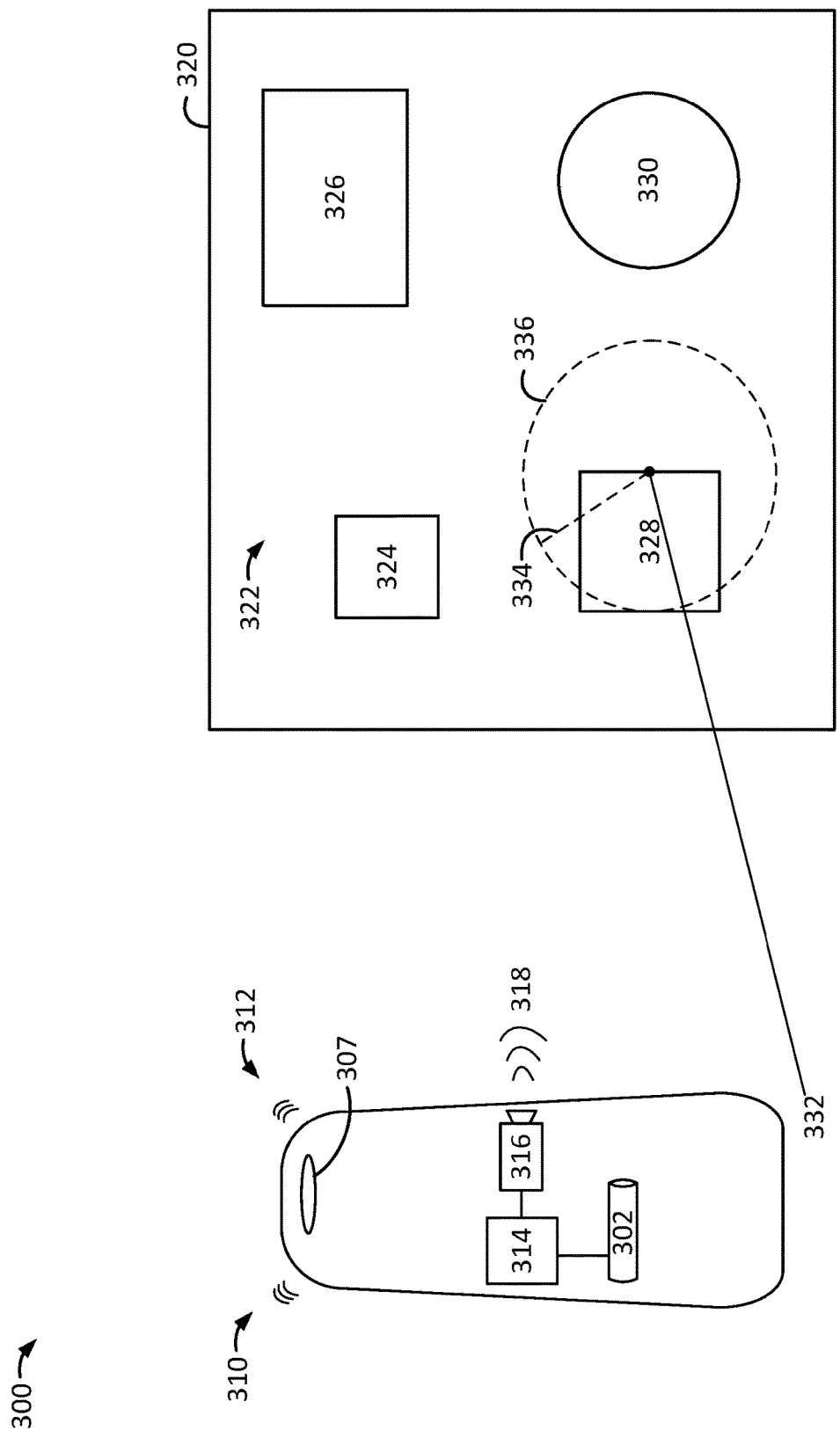
FIG. 3A illustrates an exemplary system, according to an embodiment.

FIG. 3A illustrates an exemplary system 300, according to an embodiment. As shown, the system 300, possibly referred to as a mobile system 300, may take the form of the mobile system 100 described above. For example, the tilt sensor 302 may take the form of the tilt sensor 102, the one or more processors 314 may take the form of the one or more processors 114, the transceiver 316 may take the form of the transceiver 116, and the hole 307 may take the form of the hole 107, as described above. As shown, the mobile system 300 may be located in one or more areas shown by the map 320 for illustrative purposes. For example, the mobile system 300 may be located in an environment 322 with the buildings 324, 326, 328, and/or 330. In particular, the mobile system 300 may be located at a position and/or a location 332 shown in the building 328.

In some embodiments, the tilt sensor 302 may detect one or more tilts 310 and/or 312 that may take the form of the tilts 110 and/or 112, respectively, as described above. Yet further, the respective degrees of the tilts 310 and/or 312 may vary or fluctuate between (plus or minus) 1 and 10 degrees, among other degrees and/or ranges of degrees contemplated herein. As such, the tilt sensor 302 may detect one or more tilts 310 and/or 312, one or more patterns of the tilts 310 and/or 312, and/or an absence of the tilts 310 and/or 312, among other detections related to the one or more tilts 310 and/or 312 described herein. Thus, in some instances, the one or more processors 314 may provide scanning power to initiate scanning operations and cause the transceiver 316 to scan 318 for one or more signals of interest in the environment 322, such as the beacon signals described above.

As shown, the scan 318 may extend up to a given distance 334 and/or cover a given scan environment 336. Notably, the scan distance 334 may be shortened to preserve power of the computing system 300, thereby covering a smaller scan environment 336. Yet, in some instances, the scan distance 334 may be extended to longer distances, thereby covering a larger scan environment 336, possibly for one or more periods of time. Thus, the scan 318 may pick up one or more signals of interest, such as beacon signals generated from the building 328 and/or generated from one or more beacon transmitters in the building 328. Further, the one or more processors 314 may terminate the scanning power to preserve power in the mobile system 300.

In some embodiments, the non-transitory machine-readable medium described above may cause the mobile system 300, also referred to as the mobile device 300, to perform additional operations. For example, the mobile device 300, may determine the one or more tilts 310 and/or 312 of the mobile device 300 detected by the tilt sensor 302 correspond with one or more tilt patterns of the mobile system 300. In some instances, the one or more tilt patterns may be determined based on the tilt sensor 302 detecting the tilt 310, the tilt 312, the tilt 310, and the tilt 312, among other patterns of described herein.

In some embodiments, referring also to FIG. 2B, the mobile device 300 may determine a scan interval 238 and a rest interval 240 based on the one or more tilts 310 and/or 312 that meet or exceed the tilt threshold. Further, the mobile device 300 may provide the scanning power to initiate scanning operations and cause the transceiver 316 to scan 318 the environment 336 of the mobile device 300 for one or more signals of interest based on the scan 238 and the rest interval 240, as shown in the timing diagram 230. Yet further, the mobile device 300 may terminate the scanning power based on a completion of the scan 318.

Further, consider a scenario such that the building 328 is the user's home. As such, the user may pick up the mobile device 300 from the counter in the user's home, possibly where the mobile device 300 may have been stationary. The one or more tilts 310 and/or 312 may cause the mobile device 300 to enter a given scan mode, possibly a given scan mode selected from a number of different scan modes associated with one or more power supplies of the mobile device 300. For example, the mobile device 300 may enter the scan mode to cause the transceiver 316 to initiate the scan 318 the environment 336 based on the scan interval 238 and the rest interval 240 determined from the scan mode selected. Further, the scan mode selected may be associated with a number of other scans and rest intervals, such as, the scans 238, 244, 246, 248, and/or 250, and the rest intervals 252, 254, 256, and/or 258, as described above.

In some embodiments, referring back to FIG. 2A, the mobile device 300 may determine one or more second tilts 310 and/or 312 detected by the tilt sensor 302, possibly during the scan interval 208. As such, the mobile device 300 may detect movement, possibly based on the user carrying the mobile device 208 to the building 328. In such instances, the mobile device may determine a second rest interval 210 based on the one or more second tilts 310 and/or 312 detected during the scan interval 208. As such, the mobile device 300 may terminate the scanning power for the second rest interval 210. In the example above, it should be noted that the mobile device 302 may perform the scan 318 and determine whether the tilts 310 and/or 312 are detected during the scan interval 208.

In some embodiments, the mobile device 300 may calculate a duration for the second rest interval 210 based on the one or more second tilts 310 and/or 312 detected, the scan 318, and/or the one or more signals of interest detected. For example, the mobile device 300 may calculate a longer duration for the second rest interval 210 based on the one or more tilts 310 and/or 312 detected, possibly indicating the mobile device 300 is in motion to a location, such as the building 328 described above. Yet, the mobile device 300 may calculate a shorter duration for the second rest interval 210 based on the scan 318 and/or one or more signals of interest detected, possibly to scan 318 the environment 336 for additional signals of interest.

In another example, consider a scenario such that the building 328 is a merchant store, possibly referred to as the merchant store 328. As such, the mobile device 300 may identify the one or more signals of interest from the scan 318 of the environment 336 for the scan interval 208. Further, the mobile device 300 may determine a time interval 218 without any user inputs associated with the one or more signals identified, possibly indicating that the user is not interested in the signals identified. Thus, the mobile device 300 may provide the scanning power to initiate scanning operations and cause the transceiver 316 to further scan 318 the environment 336 for one or more additional signals of interest based on the time interval 218 without any user inputs. In particular, the mobile device 300 may cause the transceiver 316 to scan 318 for the second scan interval 214.

In some embodiments, the mobile device 300 may identify the one or more signals of interest from the scan 318 of the environment 336. In some instances, the mobile device 300 may determine a recognized signal (e.g., a recognized beacon signal) in the one or more signals identified. For example, the recognized signal may correspond to data stored by the mobile device 300, possibly stored based on prior scans and/or signals identified. As such, the mobile device 300 may terminate the scanning power based on the recognized signal. In particular, the recognized signal may be associated with the merchant store 328 such that the user may purchase one or more items from the merchant store 328.

In some embodiments, the mobile device 300 may identify the one or more signals from the scan 318 of the environment 336. The mobile device 300 may determine the time interval 218 without any user inputs associated with the one or more signals identified, possibly indicating the user in not interested in the signals identified. Thus, referring back to FIG. 2B, the mobile device 300 may determine the number of scans 238, 244, 246, 248, and/or 250 shown in the timing diagram 232. Further, the mobile device 300 may determine the number of rest intervals 252, 254, 256, and/or 258 based on the time interval 218 without any user inputs. As noted, each subsequent rest interval from the number of rest intervals 252, 254, 256, and/or 258 may be exponentially longer than its previous rest interval. Thus, the mobile device 300 may provide the scanning power to initiate scanning operations and cause the transceiver 316 to scan 318 the environment 336 based on the number of scans 238, 244, 246, 248, and/or 250, and the number of rest intervals 252, 254, 256, and/or 258. As such, providing scanning power in the manner described above may preserve power in the computing device 300.

Figure 3B:
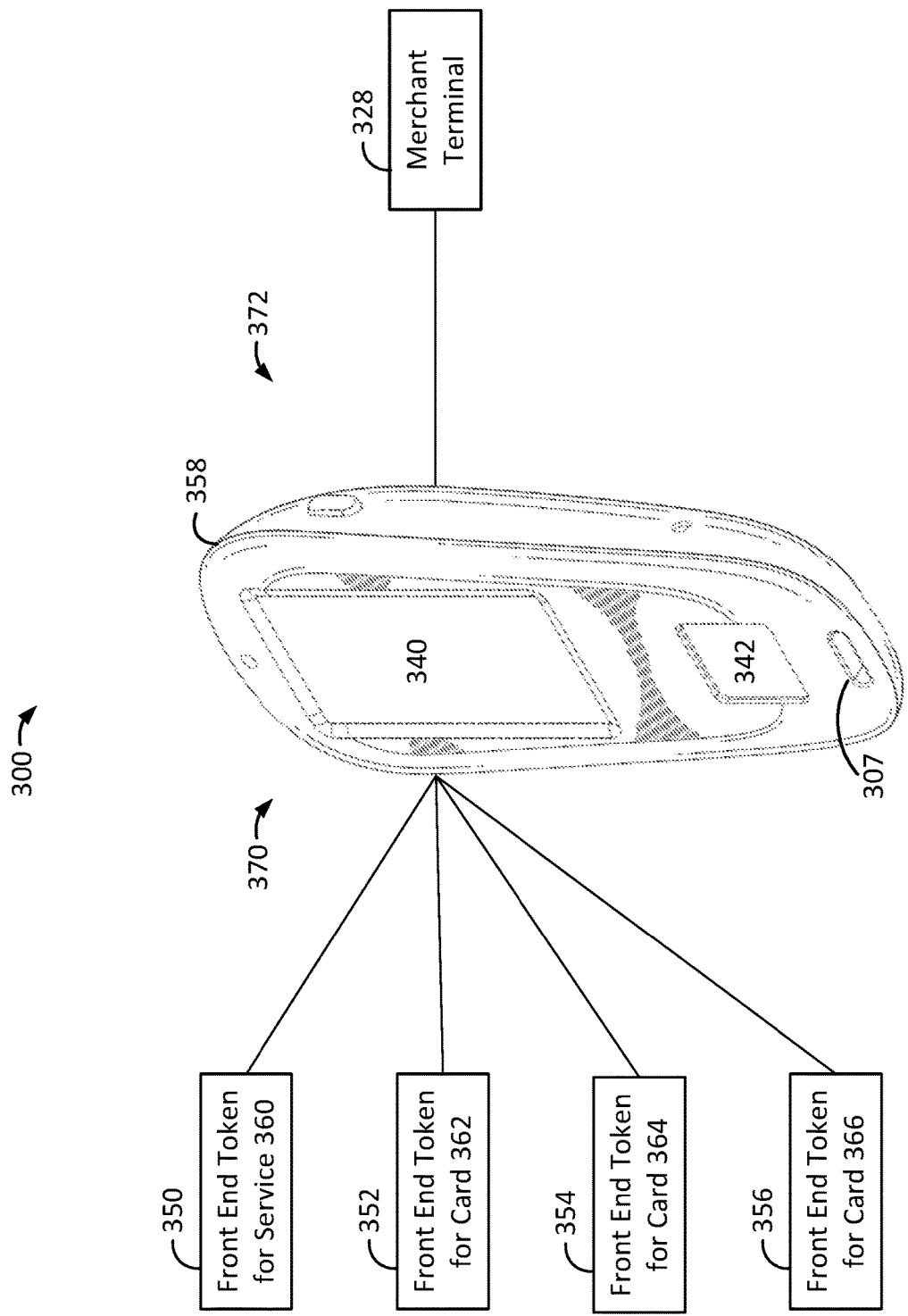
FIG. 3B illustrates an exemplary system, according to an embodiment.

FIG. 3B illustrates the exemplary system 300, according to an embodiment. The system 300, possibly referred to as the mobile system 300, may include the tilt sensor 302, the one or more processors 314, and the transceiver 316, as described above in relation to FIG. 3A. Further, as shown, the mobile system 300 may include a user interface 340, fingerprint sensor 342, and a hole 307, as illustrated in an isometric view of the system 300. Notably the hole 307 may take the form of the hole 107 described above such that the hole 307 is configured to attach and suspend from a ring and/or a keychain ring. Considering the one or more scenarios described above, the mobile system 300 may be located in one or more areas shown by the map 320, such as in the location 332 shown in the merchant building 328, possibly including the coffee shop described above. Thus, the merchant building 328 may also referred to as the merchant terminal 328.

Further, consider a scenario where the user is carrying the mobile device 300 to purchase a cup of coffee at the merchant terminal 328. As such, the mobile device 300 may detect one or more tilts 310 and/or 312, a pattern with the one or more tilts 310 and/or 312, and/or a threshold met with the one or more tilts 310 and/or 312, among other possibilities. In some instances, the mobile device 300 may also detect an absence of the one or more tilts 310 and/or 312. As such, the mobile device 300 may provide the scanning power to initiate scanning operations and cause the transceiver 316 to scan 318 the environment 336, possibly to detect one or more signals of interest. For example, the one or more signals detected may cause the user interface 340 to display a request to purchase a cup of coffee at the merchant terminal 328. As such, the user may provide one or more user inputs to the user interface 348 indicating that she would like to purchase the cup of coffee, the type of coffee, and/or the size of the coffee, among other details associated with the cup of coffee desired.

As such, the mobile device 300 may receive the one or more inputs from the user interface 348. Further, the one or more inputs may indicate a selection from various front end tokens 350, 352, 354, and/or 356 to purchase the cup of coffee. For example, the front end token (FET) 350 may be associated with one or more payment services 360 provided by PayPal, Inc. of San Jose, Calif., USA. The FET 352 may be associated with a debit and/or a credit card 362 provided by Visa, Inc. of Foster City, Calif., USA. The FET 344 may be associated with a debit and/or a credit card 364 provided by MasterCard Incorporated of Purchase, N.Y., USA. The FET 356 may be associated with a transit card 366 provided by one or more transit providers.

In some embodiments, with a selection of the FET 350, the cup of coffee may be purchased with the service 360. Further, with a selection of the FET 352, the cup of coffee may be purchased with the card 362. Yet further, with a selection of the FET 354, the cup of coffee may be purchased with the card 364. As such, the selections of the FETs 350, 352, and/or 354 may enable the corresponding service 360, the card 362, and/or the card 364, respectively, to make purchases of various items. Notably, the cup of coffee is provided in the examples above for purposes of illustration and explanation, as other items and/or services may be purchased as well. As demonstrated above, the tokens 350-356 may be selected and/or controlled at the point of sale and/or the merchant terminal 328.

In some embodiments, the selection of the FETs 350-356 may be authenticated with biometric data. For example, the selection may be authenticated with fingerprint data received by the fingerprint sensor 342. In particular, based on the mobile device 300 receiving authentic fingerprint data from the fingerprint sensor 342, the mobile device 300 may determine the selection of the FETs 350-356 to complete the purchase of the cup of coffee in the scenarios above. Yet, under other circumstances, the mobile device 300 may provide various forms of data based on receiving the authentic fingerprint data. For example, the mobile device 300 may have driver's license data including the driver's license number and/or picture. Further, the mobile device 300 may have passport data including the passport number and/or picture. As such, based on receiving the fingerprint data, the driver's license data and/or the passport data may be provided by the device 300.

In some embodiments, the mobile device 300 may be referred to as a key fob system 300. As noted, the key fob system 300 may include the user interface 340 with touch sense capabilities and the fingerprint sensor 342. Further, the key fob system 300 may include a non-transitory memory and one or more hardware processors, such as the processor 114 described above in relation to FIGS. 1A-1E. As such, the one or more hardware processors 114 may be coupled to the non-transitory memory and configured to read instructions from the non-transitory memory to cause the key fob system 300 to perform operations. In particular, the key fob system 300 may detect one or more signals associated with an environment 336 of the key fob system 300, illustrated with a given distance and/or radius 334. The key fob system 300 may also display a request on the user interface 340 to select a token from a number of tokens 350-356 based on the one or more signals detected. The key fob system 300 may also determine a selection of the token 350 from the number of tokens 350-356 based on an input received with the user interface 340, possibly a touch input received with the user interface 340. The key fob system 300 may also authenticate the selection of the token 350 based on fingerprint data received with the fingerprint sensor 342.

In some embodiments, the key fob system 300 may include a tilt sensor 302. As such, the key fob system 300 may detect one or more tilts 310 and/or 312 of the key fob system 300 with the tilt sensor 302. Further, the key fob system 300 may scan the environment 336 of the key fob system 300 based on the one or more tilts 310 and/or 312 detected. As such, the one or more signals may be detected based on scanning the environment 336.

In some embodiments, the key fob system 300 may include the accelerometer 120 described above in relation to FIGS. 1A-1E. As such, the key fob system 300 may detect one or more movements of the key fob system 300 with the accelerometer 120. The key fob system 300 may also scan the environment 336 of the key fob system 300 based on the one or more movements detected. As such, the one or more signals may be detected based on scanning the environment 336.

In some embodiments, as noted, the key fob system 300 may be configured to scan for one or more signals. Further, the key fob system 300 may include a body structure 358 that includes one or more front surfaces 370 and one or more back surfaces 372. The one or more front surfaces 370 may be configured to house and/or hold the user interface 340 and the fingerprint sensor 342. The one or more back surfaces 372 may include one or more curvilinear surfaces, possibly one or more ergonomic surfaces configured to fit in a human hand. Further, the key fob system 300 may include the hole 307 that extends from the one or more front surfaces 370 to the one or more back surfaces 372, where the hole 307 is configured to suspend and/or hang the key fob system 300 from a keychain. Further, the key fob system 300 may include the tilt sensor 302 configured to detect one or more tilts 310 and/or 312 of the key fob system 300 based on the hole 307 suspending the key fob system 300 from the keychain.

Figure 4:
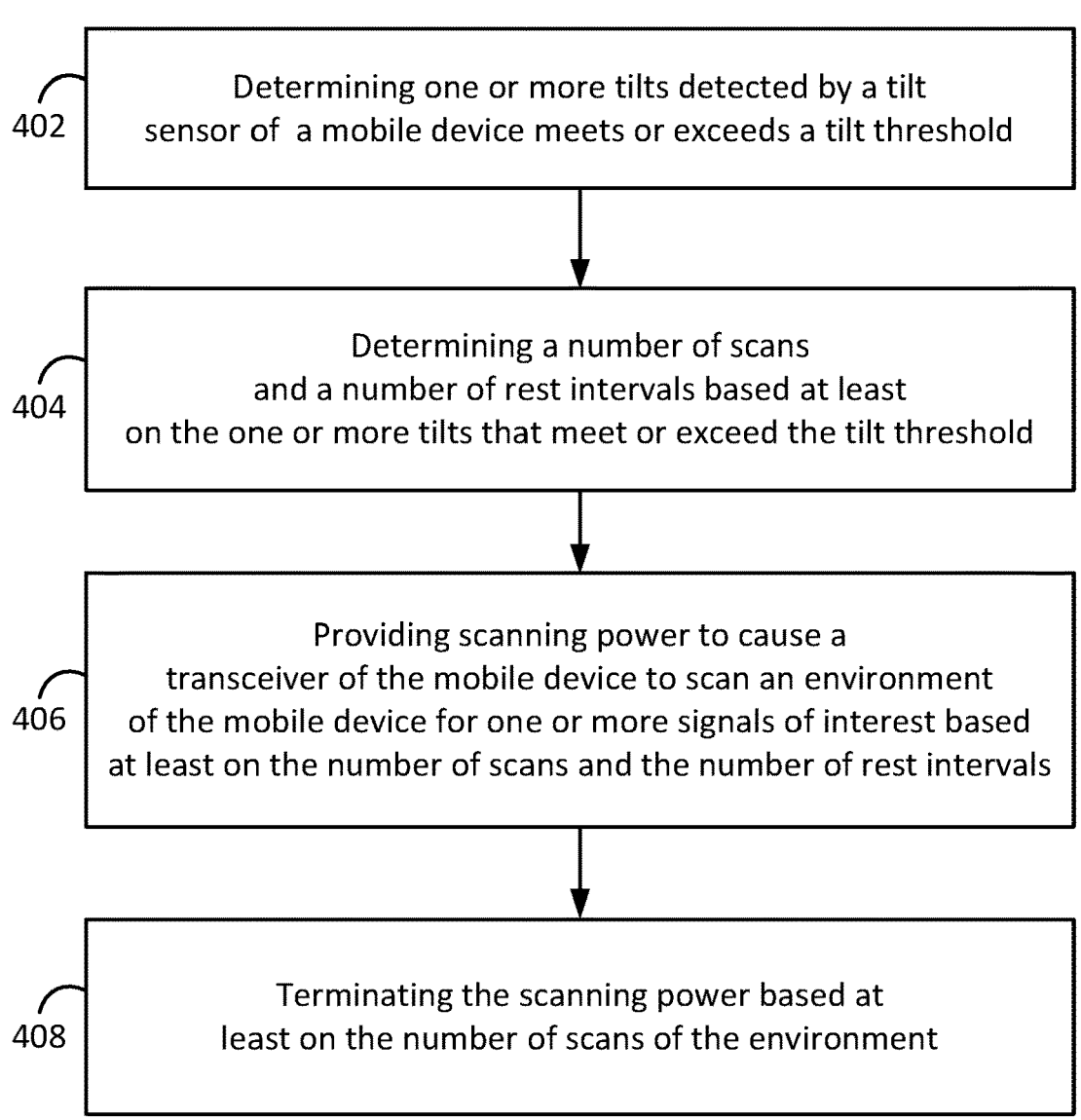
FIG. 4 illustrates an exemplary method, according to an embodiment.

FIG. 4 illustrates an exemplary method 400, according to an embodiment. Notably, one or more steps of the method 400 described herein may be omitted, performed in a different sequence, and/or combined with other methods for various types of applications contemplated herein.

As shown, at step 402, the method 400 may include determining one or more tilts detected by a tilt sensor of the mobile device meets or exceeds a tilt threshold. For example, the method 400 may include the mobile device 100 determining one or more tilts 110 and 112, the one or more tilts 310 and 312, and/or a combination of such tilts detected by the tilt sensor 102 of the mobile device 100 that meets or exceeds the one or more tilt thresholds as described herein. In some instances, a number of the one or more tilts 110, 112, 310, and/or 312 may meet or exceed the tilt threshold, possibly indicating an increase in movement of the mobile device 100. Yet further, the number of the one or more tilts 110, 112, 310, and/or 312 may meet or fall below the tilt threshold, possibly indicating a decrease in movement of the mobile device 100.

At step 404, the method 400 may include determining a number of scans and a number of rest intervals based at least on the one or more tilts that meet or exceed the tilt threshold. For example, the method 400 may include the mobile device 100 determining a number of scans 208, 214, and/or 216 based on the one or more tilts 110, 112, 310, and/or 312 described above that meet or exceed the tilt threshold. Yet further, the method 400 may include the mobile device 100 determining a number of rest intervals 218 and/or 220 based on such tilts 110, 112, 310 and/or 312 that meet or exceed the tilt threshold. In some instances, the mobile device 100 may determine the duration of the rest intervals 218 and/or 220 based on the tilts 110, 112, 310 and/or 312 that meet or exceed the tilt threshold.

At step 406, the method 400 may include providing scanning power to cause a transceiver of the mobile device to scan an environment of the mobile device for one or more signals of interest based at least on the number of scans and the number of rest intervals. For example, referring back to FIG. 3, the method 400 may include the mobile device 100 providing scanning power to cause the transceiver 116 to scan 118 the environment of the mobile device 100 for one or more signals of interest, such as one or more beacon signals of interest. For example, the mobile device 100 may scan 118 the environment based on one or more of the scans 208, 214, and/or 216, and/or the one or more of the rest intervals 218 and/or 220.

At step 408, the method 400 may include terminating the scanning power based at least on the number of scans of the environment. For example, the method 400 may include terminating the scanning power based on a completion of the number of scans, such as the scan 208, 214, and/or 216, among various combinations of such scans.

In some embodiments, the method 400 may include the mobile device 100 providing movement detection power to initiate movement detection operations, possibly to retrieve movement data from the accelerometer 120 of the mobile device 100 that corresponds to movement of the mobile device 100 detected by the accelerometer 120. The method 400 may also include the mobile device 100 determining a user activity, such as the user sitting, standing, walking, jogging, riding a bike, riding a bus, driving a car, among other possible user activities. In particular, the mobile device 100 may determine the user activity associated with the mobile device 100 based on the movement data. As such, the number of rest intervals 218 and/or 220, including the durations of the rest intervals 218 and/or 220, may be calculated based on the various user activities. As such, the method 400 may also include terminating the movement detection power based on the user activity determined.

In some embodiments, the method 400 may include the mobile device 100 providing movement detection power to retrieve movement data from the accelerometer 120 of the mobile device 100. Referring back to FIGS. 2A-2B, the method 400 may include the mobile device 100 determining one or more time intervals 208, 214, 216, 218, and/or 220 without one or more movements of the mobile device 100 based on the movement data. The method 400 may include terminating the movement detection power based on the one or more time intervals 208, 214, 216, 218, and/or 220 without the one or more movements of the mobile device 100. Further, the scanning power may also be terminated based on terminating the movement detection power, possibly to further preserve power in the mobile device 100.

In some embodiments, the method 400 may include the mobile device 100 determining a trigger 222 that causes the transceiver 116 to scan the environment for the one or more scan intervals 214 and/or 216. For example, the trigger 222 may cause the transceiver 116 to scan 118 based on one or more signals of interest identified in the wireless environment. Further, the trigger 222 may cause the transceiver 116 to scan 118 based on motion detected by the tilt sensor 102 and/or the accelerometer 120. Yet further, the trigger 222 may cause the transceiver 116 to scan based on one or more user inputs received. As described above in relation to FIG. 3B, consider the mobile device 100 takes the form of the mobile device 300. As such, the one or more user inputs may be received from the user interface 340 and/or the fingerprint sensor 342. As such, the trigger 222 may be based on the one or more user inputs to cause the transceiver 316 to scan the location 332 of the mobile device 300 at the merchant store and/or terminal 328, among other possibilities.

In some embodiments, the method 400 may include determining a second number of scans 238, 244, 246, 248, and/or 250 based on the one or more signals of interest identified. Further, the method 400 may include determining a second number of rest intervals 252, 254, 256, and/or 258 based on the one or more signals identified from the scan 118. As noted, each subsequent rest interval from the number of rest intervals 252, 254, 256, and/or 258 may be exponentially longer than its previous rest interval. Further, the method 400 may include providing the scanning power to cause the transceiver 116 to scan the environment based the second number of scans 238, 244, 246, 248, and/or 250, and the second number of rest intervals 252, 254, 256, and/or 258.

Figure 5:
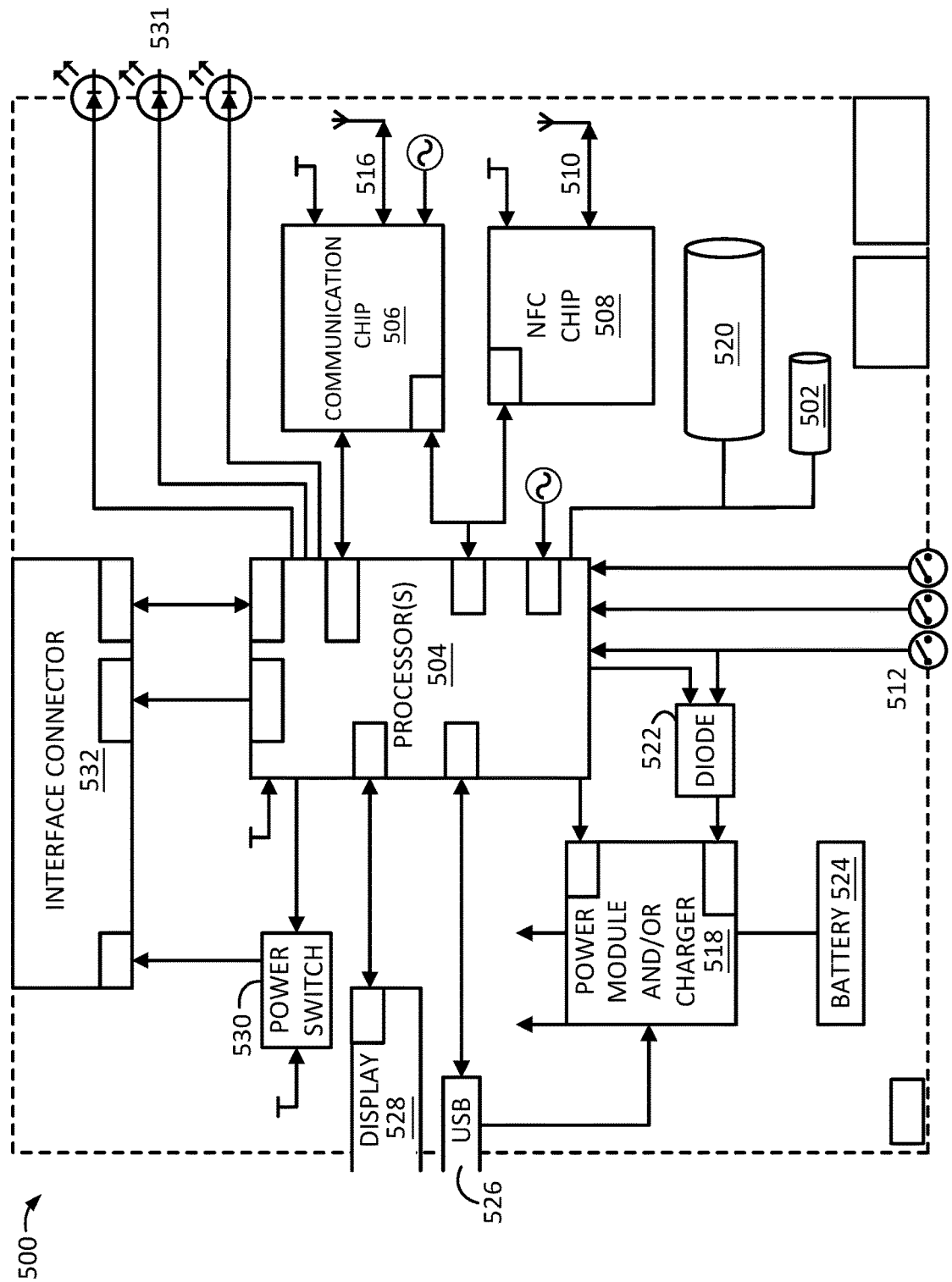
FIG. 5 illustrates an exemplary system, according to an embodiment.

FIG. 5 illustrates an exemplary system 500, according to an embodiment. The system 500 may include components from the systems 100 and/or 300 described above in relation to FIGS. 1A-4. As shown, for example, the system 500 may include a tilt sensor 502 that may take the form of the tilt sensors 102 and/or 302. Further, the system 500 may include one or more processors 504 that may take the form of the one or more processors 114 and/or 314. Yet further, the system 500 may include an accelerometer 520 that may take the form of the accelerometer 120. In addition, the system 500 may include a transceiver 516 that may take the form of the transceiver 116 and/or 316.

As illustrated, the one or more processors 504 may communicate with the communication chip 506 including the transceiver 516, possibly based on a UART or SPI connection. For example, the communication chip 506 may be a smart chip and/or a system-on-chip (SOC) configured to communicate in accordance with BLUETOOTH SMART protocols and/or BLUETOOTH LOW ENERGY protocols. In particular, the communication chip 506 may be a central and/or a hub that receives one or more signals of interest, such as the beacon signals described above. The communication chip 506 may be configured to communicate over the 2.4 to 2.485 GHz frequency range with ultra low-power consumption.

The one or more processors 504 may provide and/or terminate power in a number of ways, as described herein. For example, the one or more processors 504 may communicate with the communication chip 506 to initiate scanning operations and cause the transceiver 516 to scan for one or more signals of interests, such as the beacon signals described above, thereby causing the communication chip 506 to consume the scanning power. Further, the one or more processors 504 may communicate with the chip 506 to cause the transceiver 516 to stop scanning, thereby terminating the consumption of the scanning power. In some embodiments, the one or more processors 504 may provide the scanning power to the chip 506 to cause the transceiver 516 to scan for the one or more signals of interest, such as the beacon signals described above. Further, the one or more processors 504 may terminate the scanning power to the chip 506 such that the power of the mobile system 500 may be preserved accordingly.

The one or more processors 504 may also communicate with the near-field communication (NFC) chip 508 including the transceiver 510, possibly based on a SPI connection. As such, the one or more processors 504 may provide scanning power to initiate scanning operations based on communication with the NFC chip 508 to cause the transceiver 510 to scan an environment for NFC communication signals. In some embodiments, the one or more processors 504 may provide the scanning power to the NFC chip 508 to cause the transceiver 510 to scan for the NFC communication signals. Further, the one or more processors 504 may terminate the scanning power such that the power of the mobile system 500 may be preserved accordingly.

In some embodiments, the NFC chip 508 may be configured to capture power from one or more environments. For example, consider the mobile system 300 includes the NFC chip 508. Referring back to FIG. 3A, the NFC chip 508 may capture energy from the surrounding environment 336, possibly to convert the captured energy into electrical energy. For example, the NFC chip 508 may capture ambient energy, such as radio waves, wasted heat, kinetic energy from the one or more tilts 310 and/or 312, among other possibilities. In some instances, the captured energy may be used to power the battery 524 with the power module and/or charger 518.

The one or more processors 504 may also receive a number of user inputs 512, possibly associated with the signals of interest identified from one or more scans performed with the transceiver 516. For example, the one or more of the user inputs 512 may indicate a selection of an item (e.g., the cup of coffee) and/or an advertisement based on the one or more signals identified from the scans perform with the transceiver 516. As such, the one or more processors 504 may terminate the scanning power based on the selection to preserve the power of the mobile system 500. Further, referring back to FIG. 3B, the one or more user inputs 512 may select a front end token (FET) 350, 352, 354, and/or 356, as described above, possibly to purchase one or more items. For example, by selecting the FET 350, the one or more items may be purchased with the server 360.

The one or more processors 504 may also be connected to a power module 518 including a battery charger. For example, the power module 518 may take the form of a micro-power universal serial bus (USB) power manager with a lithium ion battery charger. As such, the power module 518 may be coupled to a USB input 526 and a battery 524 that takes the form of a lithium-ion battery. The one or more processors 504 may also be coupled to a diode 522 coupled to the user inputs 512 and the power module 518, possibly to provide synchronous power regulation.

The mobile system 500 may include additional circuitry and/or components for wirelessly charging the battery 524. For example, the system 500 may include a power receiver, possibly coupled with one or more receiver coils. In some instances, the one or more receiver coils may be placed within a given distance of a wireless power transmitter, possibly provided with or within a charging pad. For example, by placing the system 500 on the charging pad, the receiver coil may couple with an electromagnetic field generated by the charging pad to receive the wireless power transmitted by the charging pad, thereby charging the battery 524.

The one or more processors 504 may also be connected to a display 528, possibly a graphical user interface (GUI) that takes the form of the user interface 340 described above. In some instances, the processors 504 may be connected with the display 528 with a SPI connection. Further, various order requests based on the signals of interest identified with the transceiver 516 may be provided on the display 528. As such, the user may indicate the selections described above based on the user inputs 512 corresponding to the various order requests displayed. In addition, the one or more processors 504 may be connected with a power switch 530 and an interface connector 532. Yet further, the one or more processors 504 may be connected to one or more status light emitting diodes (LEDs) 531, possibly to indicate power levels of the battery 524.

The tilt sensor 502 may also provide a number of different signals to the one or more processors 504. For example, the tilt sensor 502 may provide a wake-up, an activate, an initiate, and/or an enable signal to the one or more processors 504. In practice, for instance, the tilt sensor 502 may be a passive tilt switch that consumes little to no power. Yet, the tilt sensor 502 may be configured to provide one or more signals described above to wake-up an interrupt line and/or another type of a circuit or circuit element in the mobile system 500. As such, the tilt sensors described herein (e.g., the tilt sensors 102, 302, and/or 502) should not be limited to preserving scanning power, movement detection power, and/or other types of power described above.

In particular, the tilt sensors 102, 302, and/or 502 described herein may be used to control and/or manage power of the mobile system 500, including particular operations, processes, and/or tasks associated with the one or more processors 504 that consume power from the mobile system 500. As such, the signals described above from the tilt sensors 102, 302, and/or 502 may be passively interpreted by the one or more processors 504, possibly based on configurations (e.g., user configurations) of the mobile system 500. In some instances, the signals may also be actively interpreted by the one or more processors 504 or possibly interpreted based on a combination of passive interpretations and active interpretations, among other possibilities.

Notably, one or more processors 504 may also receive fingerprint data from a fingerprint sensor of the mobile device 500, such as the fingerprint sensor 342 described above in relation to FIG. 3B. For example, consider the mobile system 500 takes the form of the mobile system 300, including the fingerprint sensor 342. Referring back to FIG. 4, the method 400 may include the mobile device 500 determining an authentication of a user of the mobile device 500 based on the one or more tilts detected, such as the tilts 110, 112, 310, and/or 312. For example, one or more of such tilts 110, 112, 310, and/or 312, and/or patterns of the tilts 110, 112, 310, and/or 312 may be unique to a given user, possibly indicating a level of authentication of the user. Yet further, the method 400 may also include the mobile device 500 receiving fingerprint data from a fingerprint sensor 342 of the mobile device 500. As such, the method 400 may include verifying the authentication of the user based on the fingerprint data received. In particular, the fingerprint data may verify the initial level of authentication based on the one or more tilts 110, 112, 310, and/or 312 detected.

In some embodiments, the mobile device 500 may be referred to as a key fob system 500. As such, the key fob system 500 may include a user interface, such as the user interface 340 described above in relation to FIG. 3B. Further, as noted, the key fob system 500 may include the near field communication (NFC) chip 508. The key fob system 500 may also include a non-transitory memory and one or more hardware processors 504 coupled to the non-transitory memory and configured to read instructions from the non-transitory memory to cause the key fob system 500 to perform operations. In particular, the key fob system 500 may displaying a request on the user interface 340 to select a token from a number of tokens 350-356. The key fob system 500 may also determine a selection of the token 350 from the number of tokens 350-356 based on an input received with the user interface 340. As such, the key fob system 500 may enable the NFC chip 508 to connect with a merchant terminal, such as the merchant terminal 328 described above in relation to FIGS. 3A and 3B, based on the selection of the token 350. The key fob system 500 may also complete a transaction with the token 350 based on the NFC chip 508 connected with the merchant terminal 328.

As noted, the mobile systems 100, 300, and/or 500 described above in relation to FIGS. 1-5 may connect with a remote server in the backend infrastructure based on the one or more signals of interest identified. For example, referring to FIGS. 3A and 3B, a user may be able to complete a transaction, e.g., purchase a cup of coffee, based on the mobile device 300 and/or the merchant terminal 328 connecting with the remote server. The server may operate as part of the data infrastructure and one or more networks. The server may be configured to perform operations in relation to a service provider or payment provider, such as PayPal, Inc. of San Jose, Calif., USA.

Figure 6:
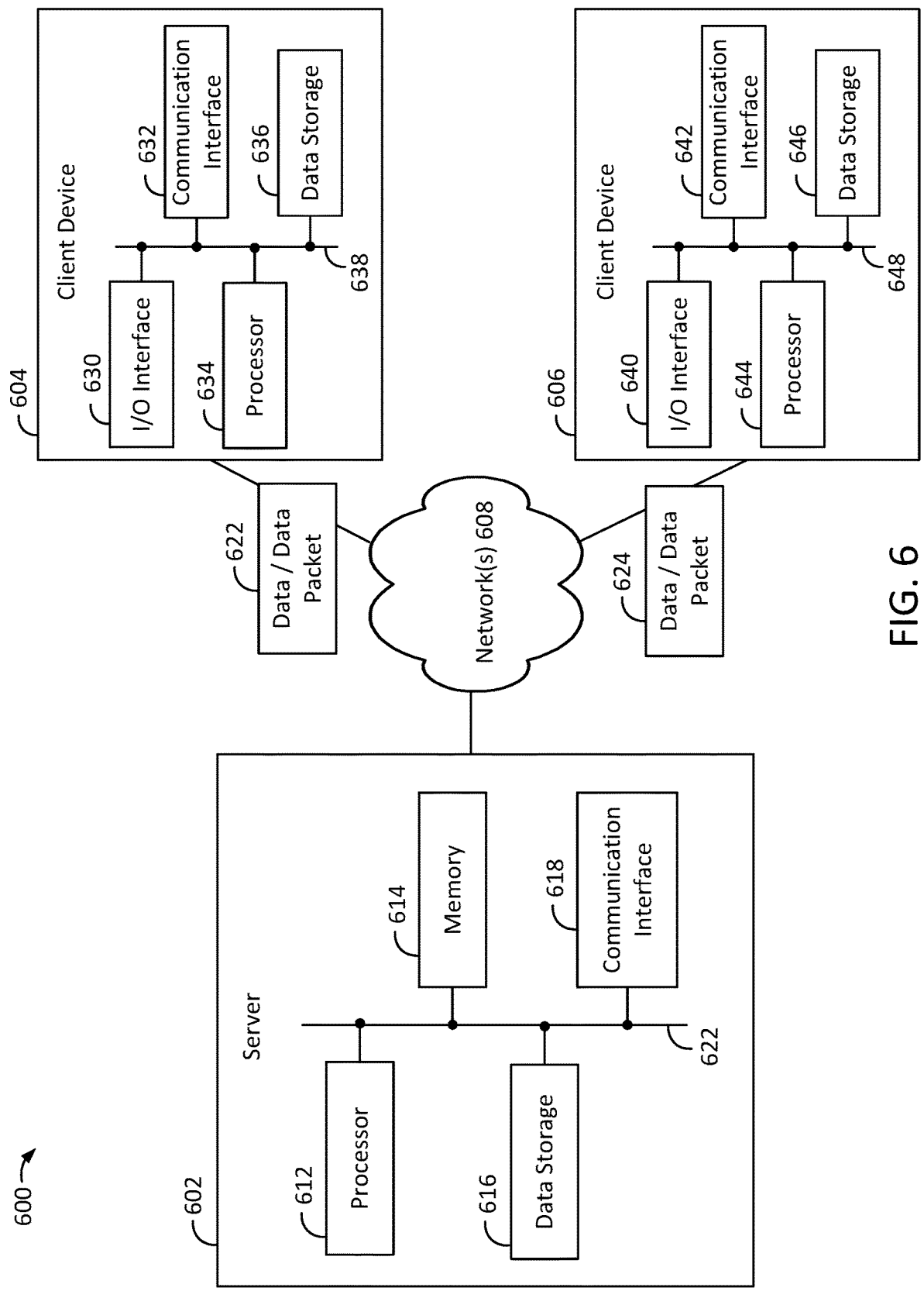
FIG. 6 is a block diagram of an exemplary system, according to an embodiment.

FIG. 6 is a block diagram of an exemplary system 600, according to an embodiment. The system 600 may be configured to transfer data over one or more networks 608 of the system 600. In particular, the server 602 may transfer (e.g., send and/or receive) data with the client devices 604 and/or 606 over the one or more communication networks 608. For example, consider a scenario where the client device 604 takes the form of the mobile device 300 described above in relation to FIGS. 3A and 3B. Further, consider that the client device 606 takes the form of the merchant terminal 328. As such, in view of the scenarios described above in relation to FIG. 3B, the mobile device 604 may determine a selected front end token (FET) 350 from the one or more FETs 350, 352, 354, and/or 356 available to complete a transaction with the merchant terminal 606. As such, the selected FET 350, possibly shown in FIG. 6 as the selected FET 624, may be transferred from the merchant terminal 606 to the one or more networks 608.

In some embodiments, referring back to FIG. 4, the method 400 may include the mobile device 300 determining the FET selected 350 for a transaction requested by the mobile device 300. In some instances, the FET 350 is selected from a number of the FETs 350, 352, 354, and/or 356 available to the mobile device 300. As noted, each token 350, 352, 354, and/or 356 may correspond to a payment instrument, such as the service 360, the card 362, the card 364, and/or the card 366, respectively. The method 400 may include the mobile device 300 causing the merchant terminal 328 to transfer the FET 350 selected to the remote server 602 coupled with the one or more networks 608. As such, the FET 350 selected is transferred to complete the transaction requested by the mobile device. As such, the method 400 may include the mobile device 400 displaying an indication of the completed transaction with the FET 350 selected.

The system 600 may operate with more or less than the computing devices shown in FIG. 6, where each device may be configured to communicate over one or more communication networks 608, possibly to transfer data accordingly. In some instances, the one or more communication networks 608 may include a data network and a cellular network, among other possible networks. In some instances, the communication network 608 may include web servers, network adapters, switches, routers, network nodes, base stations, microcells, and/or various buffers/queues to exchange data/data packets 622 and/or 624.

The data/data packets 622 and/or 624, may be transferrable via communication protocols such as Transmission Control Protocol/Internet Protocol (TCP/IP). In various embodiments, each of the data/data packets 622 and 624 may be assembled or disassembled into larger or smaller packets of varying sizes, such as sizes from 6,000 to 6,500 bytes, for example, among other possible data sizes. As such, data/data packets 622 and/or 624 may be transferrable over the network 608 and to various locations in the data infrastructure in the system 600.

In some embodiments, the server 602 may take a variety of forms. The server 602 may be an enterprise server, possibly operable with one or more operating systems to facilitate the scalability of the system 600, possibly also referred to as the data infrastructure 600. For example, the server 602 may operate with a Unix-based operating system configured to integrate with a growing number of other servers, client devices, and/or networks over various system architectures. The server 602 may further facilitate the workloads associated with numerous data transfers and workloads in view of an increasing number of users in the data infrastructure system 600. In particular, the server 602 may facilitate the scalability of the increasing number of users to eliminate data congestion, bottlenecks, and/or transfer delays.

In some embodiments, the server 602 may include multiple components, such as one or more processors 612, one or more non-transitory memories 614, one or more non-transitory data storages 616, one or more communication interfaces 618, among other possible components, any of which may be communicatively linked via a system bus, network, or other connection mechanism 622. The one or more processors 612 may take the form of a multi-purpose processor, a microprocessor, a special purpose processor, a digital signal processor (DSP) and/or other types of processing components.

The non-transitory memory component 614 and/or the non-transitory data storage 616 may include one or more volatile, non-volatile, and/or replaceable storage components, such as magnetic, optical, and/or flash storage that may be integrated in whole or in part with the processor 612. Further, the memory component 614 may include or take the form of a non-transitory computer-readable storage medium, having stored thereon computer-readable instructions that, when executed by the processing component 612, cause the server 602 to perform operations, such as those described in this disclosure and illustrated by the accompanying figures.

The communication interface or component 618 may take a variety of forms and may be configured to allow the server 602 to communicate with one or more devices, such as client devices 604 and/or 606, according to a number of protocols. For example, the communication interface 618 may include a transceiver that enables the server 602 to communicate with the client devices 604 and/or 606 via the one or more communication networks 608. Further, the communication interface 618 may include a wired interface, such as an Ethernet interface, and/or a wireless interface, such as a cellular interface configured to one or more protocols (e.g., GSM, CDMA, UMTS, EV-DO, WiMAX, or LTE) and/or microcell interface and/or a Wi-Fi interface. The wireless interface may also include interfaces operable to transfer data over short distances utilizing short-wavelength radio waves in approximately the 2.4 to 2.485 GHz range. In some instances, the communication interface 618 may send/receive data or data packets to/from client devices 604 and/or 606.

The client devices 604 and 606 may also be configured to perform a variety of operations such as those described in this disclosure and illustrated by the accompanying figures. In particular, client devices 604 and 606 may be configured to transfer data/data packets 622 and/or 624 with the server 602, that include requests for transactions with FETs 350-356. Further, the data/data packets 622 and/or 624 may also include location data, GPS coordinate data, beacon data, WI-FI data, base station data, triangulation data, peer data, social media data, sensor data, movement data, temperature data, and/or other types of data described herein.

In some embodiments, the client devices 604 and 606 may include or take the form of a smartphone system, a personal computer (PC) (e.g., a laptop device), a wearable computer device, a head-mountable display (HMD) device, tablet computer device, a merchant device, a smart watch device, other types of wearable devices, and/or other types of computing devices configured to transfer data, among other possibilities. The client devices 604 and 606 may include various components, including, for example, input/output (I/O) interfaces 630 and 640, communication interfaces 632 and 642, processors 634 and 644, and non-transitory data storages 636 and 646, respectively, all of which may be communicatively linked with each other via a system bus, network, or other connection mechanisms 638 and 648, respectively.

The I/O interfaces 630 and 640 may be configured to receive inputs from and provide outputs to one or more users of the client devices 604 and 606. Thus, the I/O interfaces 630 and 640 may include input hardware with tangible surfaces such as touchscreens with touch sensitive sensors and/or proximity sensors. The I/O interfaces 630 and 640 may be synched with a microphone configured to receive voice commands, a computer mouse, a keyboard, and/or other input mechanics from the real world environment. In addition, I/O interfaces 630 and 640 may include output hardware such as touchscreen displays, a sound speaker, other audio output mechanism, a haptic feedback system, and/or other components.

In some embodiments, communication interfaces 632 and 642 may include or take a variety of forms. For example, communication interfaces 632 and 642 may be configured to allow client devices 604 and 606, respectively, to communicate with one or more devices according to a number of protocols. For instance, communication interfaces 632 and 642 may be configured to allow client devices 604 and 606, respectively, to communicate with the server 602 via the communication network 608. The processors 634 and 644 may include a multi-purpose processor, a microprocessor, a special purpose processor, a digital signal processor (DSP), an application specific integrated circuit (ASIC), a programmable system-on-chip (SOC), field-programmable gate array (FPGA), and/or other types of processing components.

The non-transitory data storages 636 and 646 may include one or more volatile, non-volatile, removable, and/or non-removable storage components, and may be integrated in whole or in part with processors 634 and 644, respectively. Further, data storages 636 and 646 may include or take the form of non-transitory computer-readable mediums, having stored thereon instructions that, when executed by processors 634 and 644, cause the client devices 604 and 606 to perform operations, respectively, such as those described in this disclosure and illustrated by the accompanying figures.

In some embodiments, the one or more communication networks 608 may be used to transfer data between the server 602, the client device 604, the client device 606, and/or other computing devices associated with the data infrastructure system 600. The communication network 608 may be a packet-switched network configured to provide digital networking communications and/or exchange data of various forms, content, type, and/or structure. The communication network 608 may include a data network such as a private network, a local area network, and/or a wide area network. Further, the communication network 608 may include a cellular network with one or more base station and/or cellular networks of various sizes.

It can be appreciated that the server 602 and the client devices 604 and 606 illustrated in FIG. 6 may be deployed in other ways. The operations performed and/or the services provided by such client devices 604 and 606 may be combined or separated for a given embodiment and may be performed by a greater number or a fewer number of devices. Further, one or more devices may be operated and/or maintained by the same or different entities. Yet, further each device may be associated with one or more accounts.

In some embodiments, an account, possibly also referred to a user account, may be a compilation of data associated with a given user. Some examples of accounts may include accounts with service providers described above and/or other types of financial, transactional, and/or e-commerce related accounts. Further, accounts may also include social networking accounts, e-mail accounts, smartphone accounts, music playlist accounts, video streaming accounts, among other possibilities. For example, an account for a particular user may include data related to the user, data related to the user's interest, and/or data representing the user. Further, the user may provide various types of data to the account via a user device, e.g., client devices 604 and/or 606.

The user account may be displayed on a client device, possibly through I/O interfaces 630 and/or 640 described above in relation to FIG. 6. Thus, the user account may be displayed on a smartphone system and/or any of the devices described herein to access the account. For example, the user may manage one or more of their accounts on client devices 604 and/or 606. In particular, the client device 604 may be used to generate, view, and/or send one or more requests to transfer funds from one account to another account, such as an account accessible by the client device 606.

In some embodiments, a user may have a single account such as an account with a service or payment provider described above representing the user for multiple other accounts. For example, the single user account may represent the user for other e-mail accounts, social networking accounts, smartphone accounts, as well as websites, applications, and/or other services. For example, a user could opt to use their account as a multi-purpose account for performing various operations, including communicating with numerous requesters and sources.

In some embodiments, a user account may be created by one or more users. For example, one account may be a family account where a number of family members or users may have access to the family account. In some instances, the account may be a corporate account, where employees, staff, worker personnel, and/or contractors, among other individuals may have access to the corporate account. Yet further, it should be noted that a user, as described herein, may be a robot, a robotic system, a computing device, a computing system, and/or another form of technology capable of transferring data and/or funds corresponding to the account. A user may be required to provide a login, a password, a code, an encryption key, authentication data, biometric data, and/or other types of data to access to the account.

Figure 7:
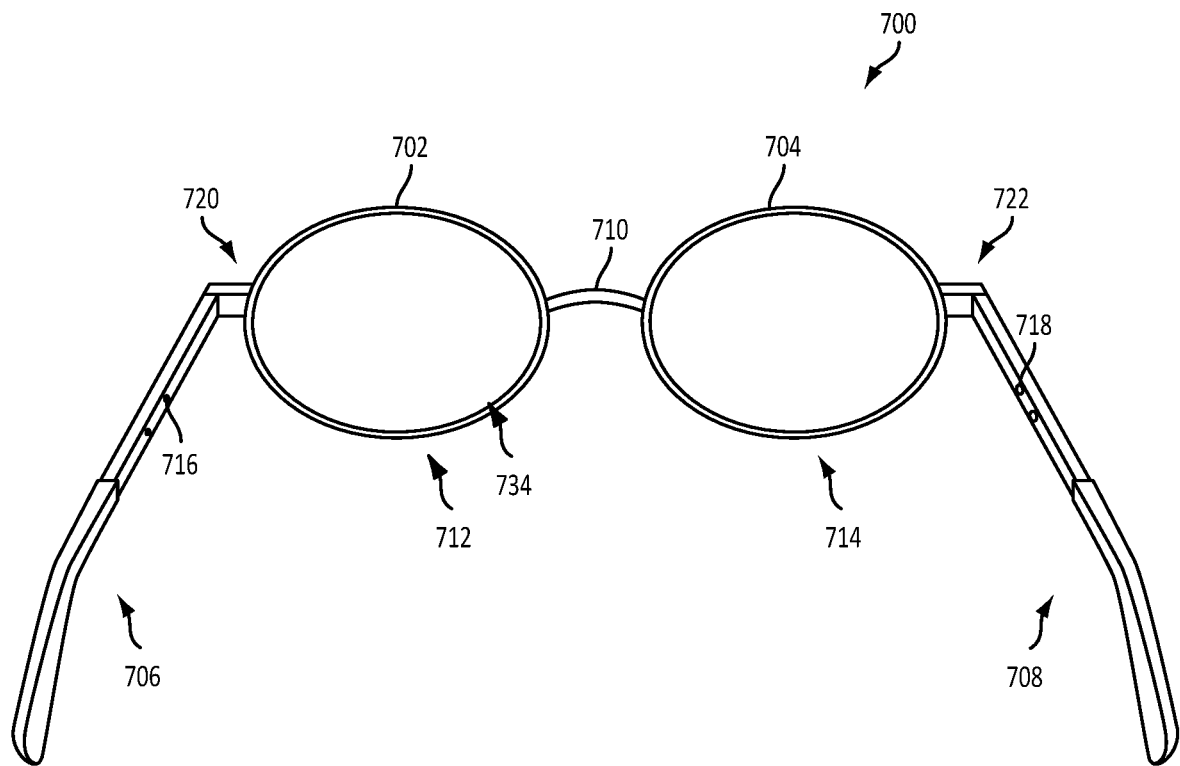
FIG. 7 illustrates an exemplary wearable computing device, according to an embodiment.

FIG. 7 illustrates an exemplary wearable computing device 700, according to an embodiment. The wearable computing device 700 may include one or more of the components from the mobile systems 100, 300, and/or 500 to perform a number of the operations described herein. For example, the wearable computing device 700 may include the one or more tilt sensors 102 and/or 302 to preserve power in the wearable computing device 700.

As illustrated, the wearable computing device 700 may take the form of a head-mountable display (HMD). As shown, the wearable computing device 700 may be wearable as a HMD device and/or another mountable device, e.g., a wrist-mountable device. The wearable computing device 700 may include lenses 702 and 704. The device 700 may also include a side component 706, a side component 708, and a middle component 710. For example, the device 700 may be mountable on a user's head such that the side component 706 rests on one ear of the user and the side component 708 rests on the other ear of the user. Further, the middle component 710 may rest on the nose of the user.

In some instances, the lenses 702 and 704 may be positioned in front of the user's eyes. Further, the lenses 702 and 704 may include displays 712 and 714, respectively. In some instances, the displays 712 and 714 may be transparent, partially see-through, and/or configured to provide an augmented reality. Further, the displays 712 and/or 714 may include touch pad displays. In particular, the touch pad displays may include touch sensor composed of see-through materials, such as indium tin oxide, among other possibilities. As such, the displays 712 and/or 714 may be configured to receive touch inputs and display data such that the user can manipulate graphics provided by the displays 712 and/or 714. The lenses 702 and/or 704 may also include scanners such as laser scanners configured to scan the eyes of the user to retrieve biometric inputs based on the user's eyes, retinas, and/or irises, possibly for authenticating a wearer to be an authorized user.

The wearable computing device 700 may include one or more sensors 716 and/or 718 (e.g., the tilt sensors 102, 302, and/or 502) configured to receive a number of inputs associated with the user. The one or more sensors 716 and/or 718 may also include accelerometers, gyroscopes, compasses, barometers, capacitive sensors, haptic sensors, temperature sensors, ambient light sensors, sound sensors, image sensors, biometric sensors, moisture sensors, electrodes, and/or chemical sampling sensors, among other types of sensors to receive inputs from the user. For example, based on the way the wearable computing device 700 is worn as a head-mountable device, the sensors 716 and/or 718 may be configured to receive inputs directly and/or indirectly from the user. In some embodiments, the lens 702 may include a sensor that may, for example, include a capacitive sensor and/or proximity sensor to sense, detect, and/or identify the user of the device 700. Further, the sensor may include a biometric sensor such as a fingerprint sensor. Thus, the fingerprint sensor may receive one or more fingerprint inputs from user, possibly to view accounts of the one or more requesters 310.

FIGS. 8-16 provide various views of the systems described herein, such as the system 300. The broken lines in FIGS. 8-16 are provided for the purpose of illustrating portions of the system 300, possibly a portable user device.

Figure 8:
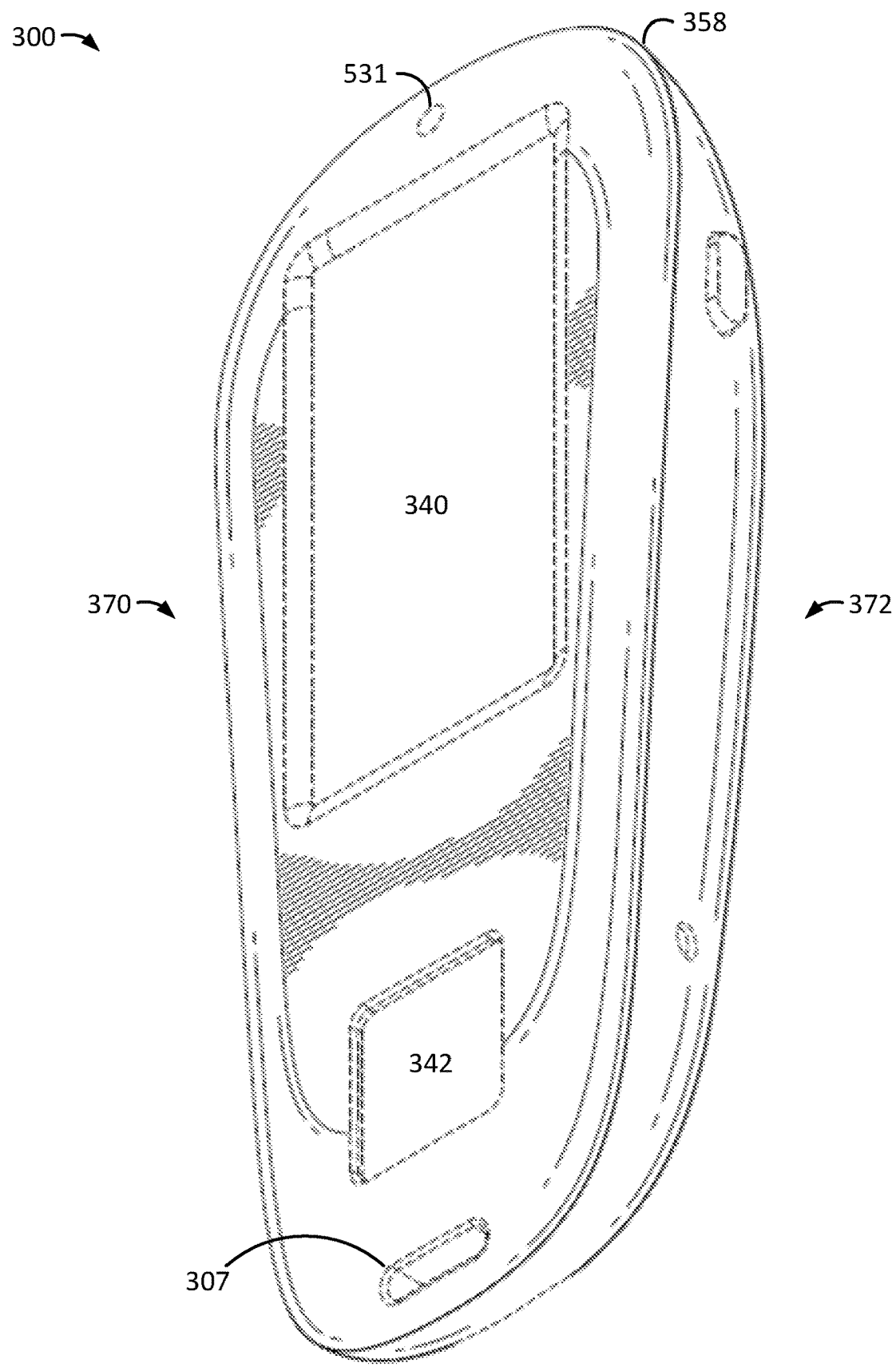
FIG. 8 is a front-bottom-right perspective view of an exemplary system embodying a new design.

FIG. 8 is a front-bottom-right perspective view of an exemplary system 300 embodying a new design. As shown, the system 300 may include the one or more status light emitting diodes (LEDs) 531, the user interface 340, the fingerprint sensor 342, the hole 307, the body structure 358, the one or more front surfaces 370, and/or the one or more back surfaces 372, as described above in relation to FIG. 3B.

Figure 9:
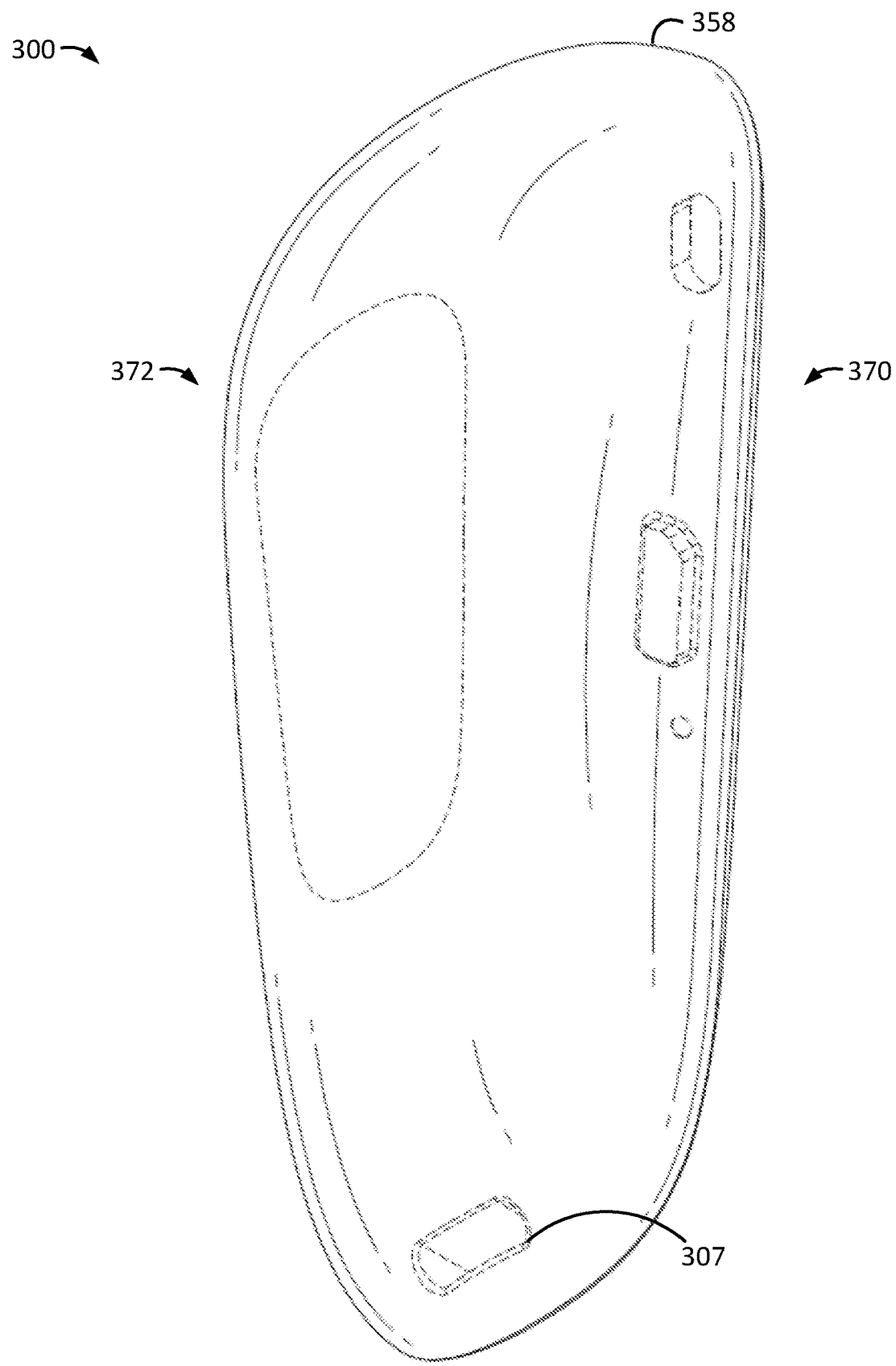
FIG. 9 is a rear-bottom-left perspective view of the exemplary system embodying the new design.

FIG. 9 is a rear-bottom-left perspective view of the exemplary system 300 embodying the new design. As shown, the system 300 may include the hole 307, the body structure 358, one or more front surfaces 370, and/or the one or more back surfaces 372 described above.

Figure 10:
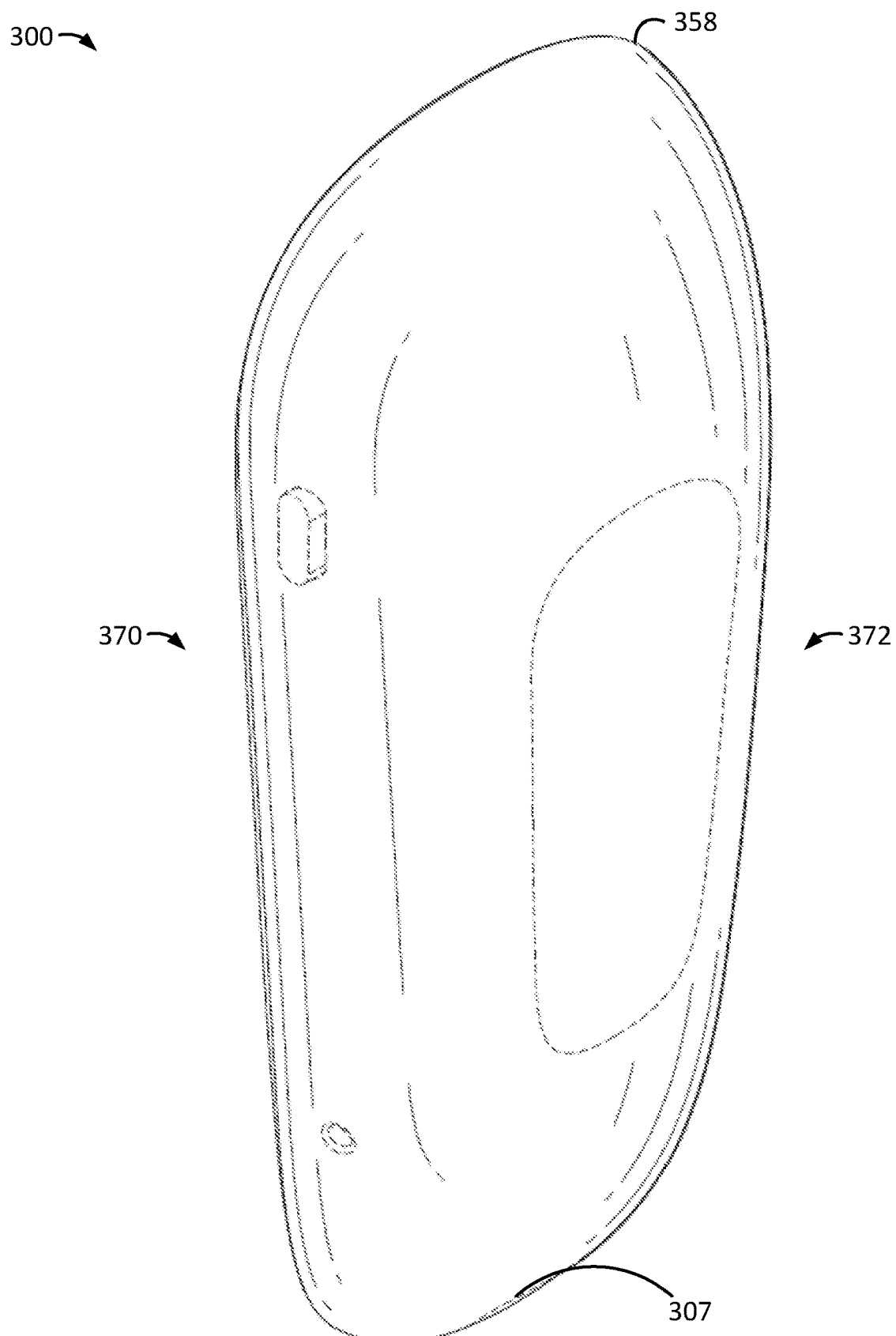
FIG. 10 is a rear-top-right perspective view of the exemplary system embodying the new design.

FIG. 10 is a rear-top-right perspective view of the exemplary system 300 embodying the new design. As shown, the system 300 may include the hole 307, the body structure 358, one or more front surfaces 370, and/or the one or more back surfaces 372 described above.

Figure 11:
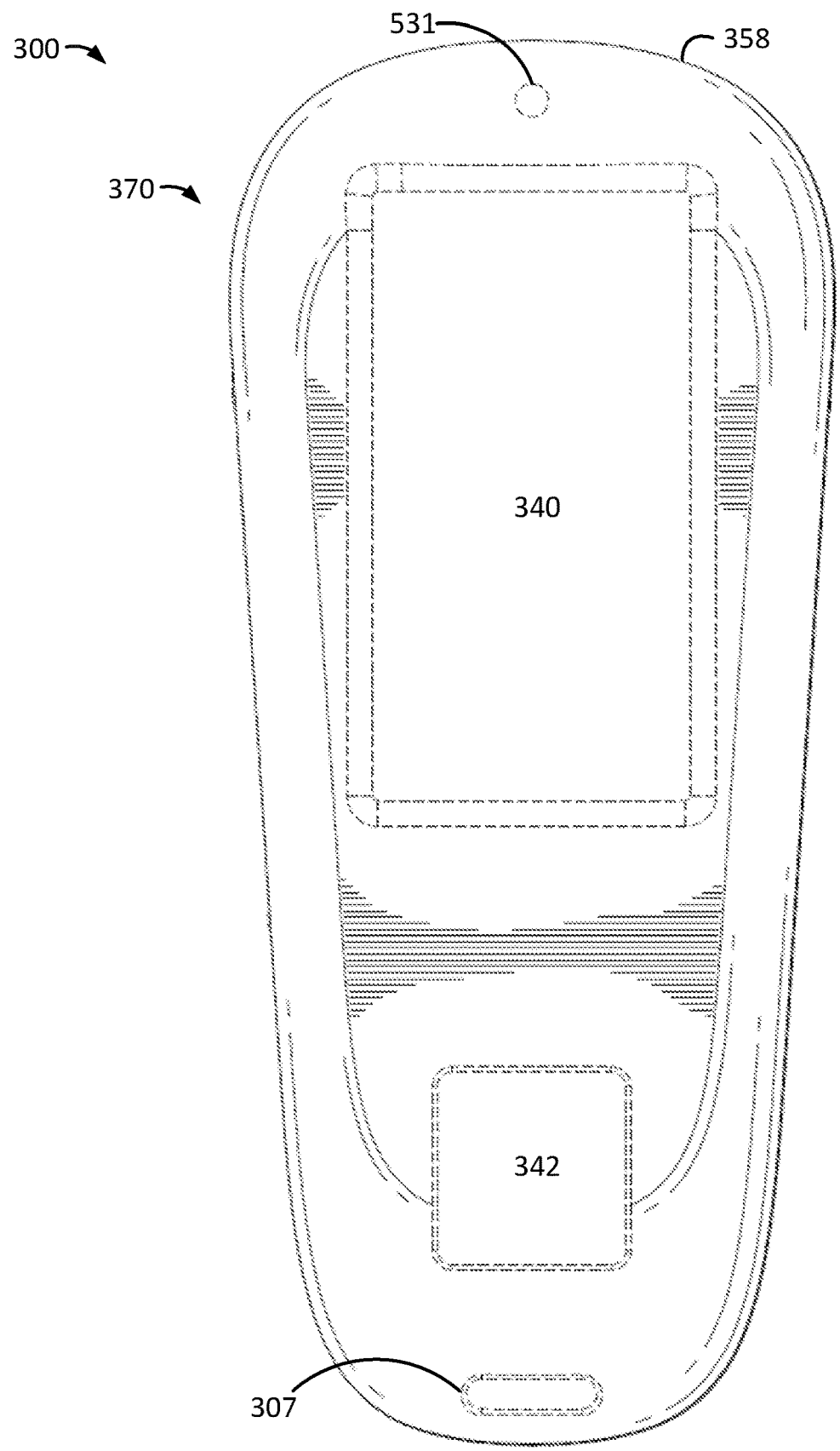
FIG. 11 is a front view of the exemplary system embodying the new design.

FIG. 11 is a front view of the exemplary system 300 embodying the new design. As shown, the system 300 may include the one or more status LEDs 531, the user interface 340, the fingerprint sensor 342, the hole 307, the body structure 358, and the one or more front surfaces 370 described above.

FIG. 12 is a right side view of the exemplary system 300 embodying the new design. As shown, the system 300 may include the body structure 358, the one or more front surfaces 370, and the one or more back surfaces 372 described above.

Figure 13:
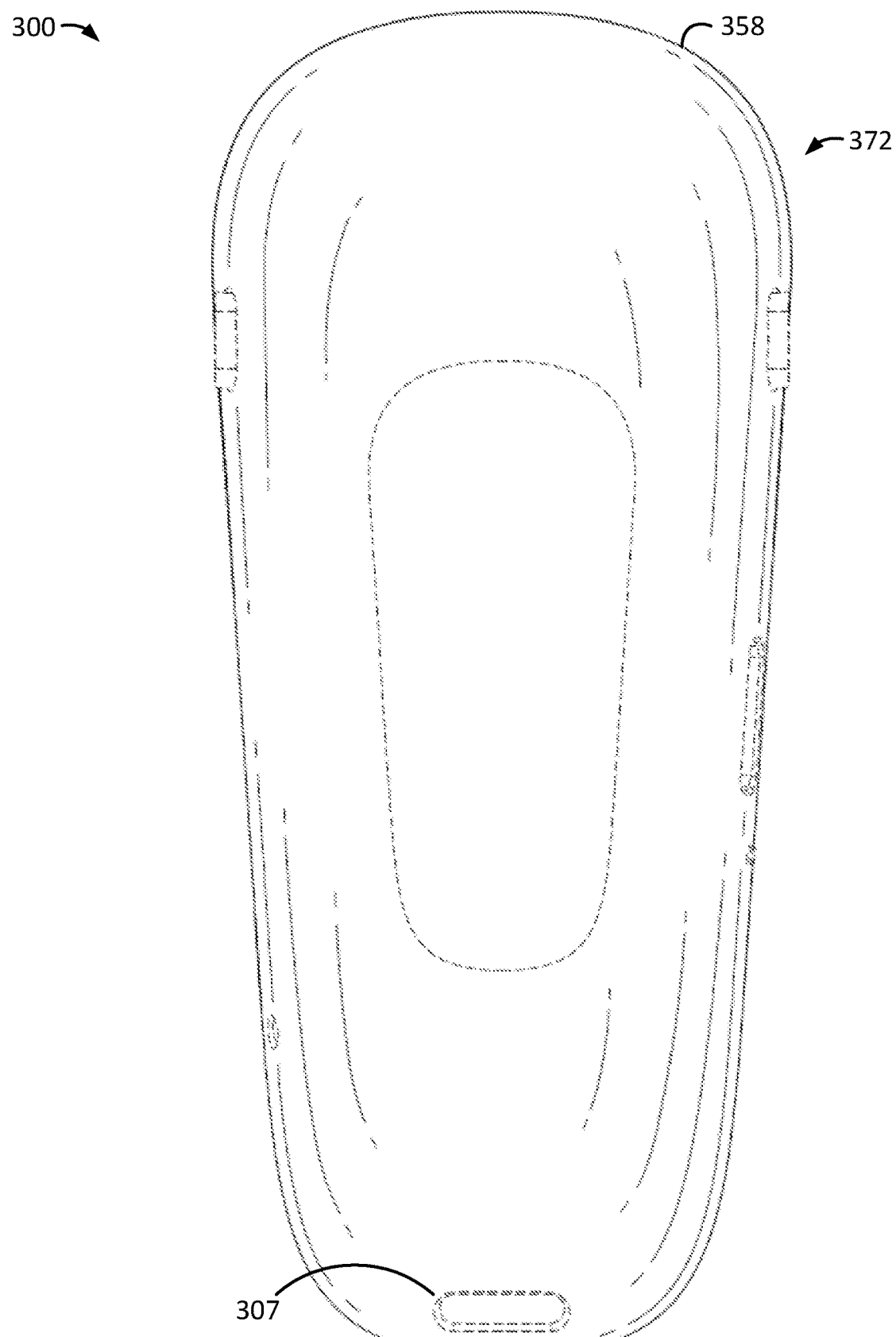
FIG. 13 is a rear view of the exemplary system embodying the new design.

FIG. 13 is a rear view of the exemplary system 300 embodying the new design. As shown, the system 300 may include the hole 307, the body structure 358, and/or the one or more back surfaces 372 described above.

FIG. 14 is a left side view of the exemplary system 300 embodying the new design. As shown, the system 300 may include the body structure 358, the one or more front surfaces 370, and the one or more back surfaces 372 described above.

Figure 15:
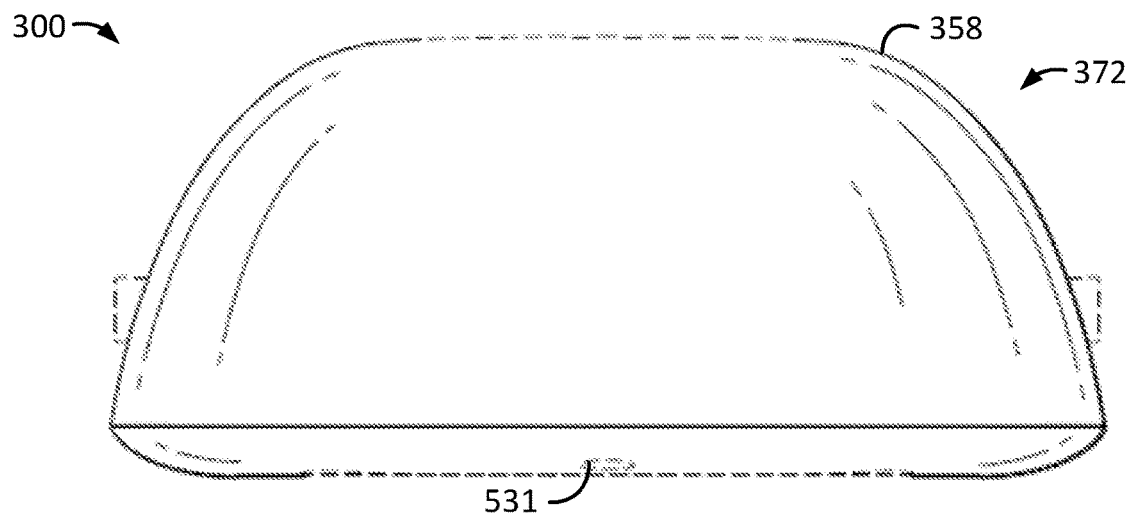
FIG. 15 is a top view of the exemplary system embodying the new design.

FIG. 15 is a top view of the exemplary system 300 embodying the new design. As shown, the system 300 may include the body structure 358, the one or more front surfaces 370, and the one or more back surfaces 372 described above.

Figure 16:
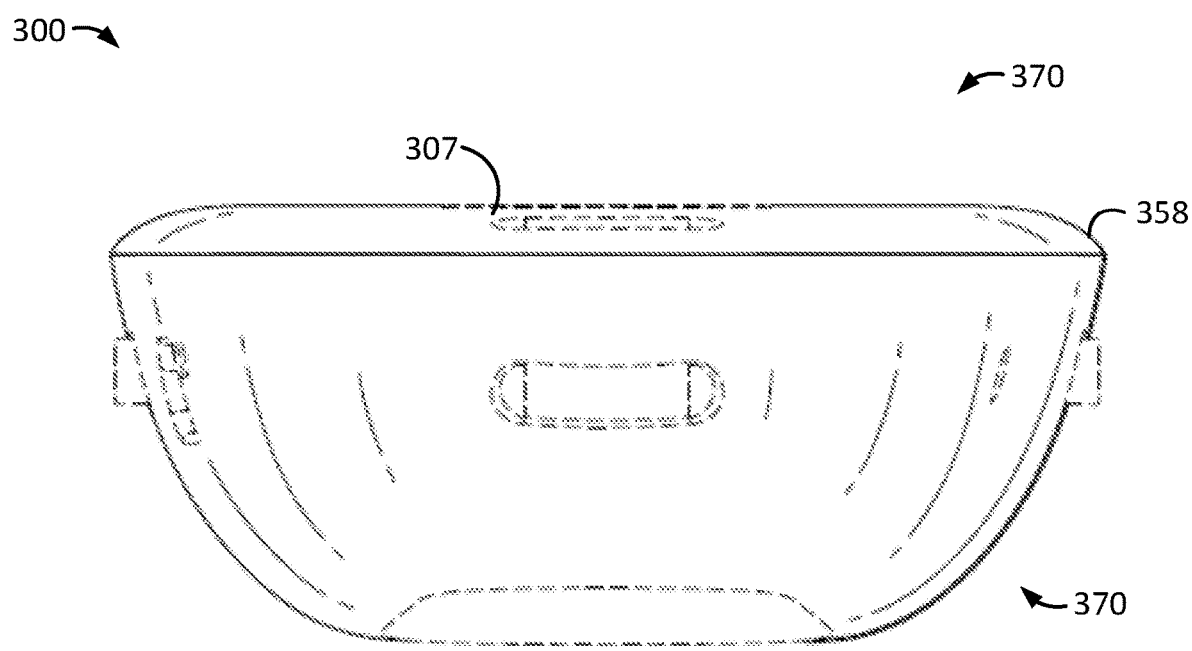
FIG. 16 is a bottom view of the exemplary system embodying the new design.

FIG. 16 is a bottom view of the exemplary system 300 embodying the new design. As shown, the system 300 may include the body structure 358, the one or more front surfaces 370, and the one or more back surfaces 372 described above.

The present disclosure, the accompanying figures, and the claims are not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

The invention claimed is:

1. A mobile computing system, comprising:
a non-transitory memory; and
one or more processors coupled to the non-transitory memory and configured to read instructions from the non-transitory memory to cause the mobile computing system to perform operations comprising:
   determining a series of tilt amounts of the mobile computing system, wherein the series of tilt amounts corresponds to tilts detected by a tilt sensor;
   determining a tilt pattern based on the series of tilt amounts of the mobile computing system;
   determining that the tilt pattern corresponds to a first predetermined tilt pattern of a plurality of tilt patterns;
   in response to the determining that the tilt pattern corresponds to the first predetermined tilt pattern of the plurality of tilt patterns,
providing scanning power to cause a transceiver of the mobile computing system to scan an environment for one or more signals of interest; and
   identifying the one or more signals of interest from the scan of the environment.

2. The mobile computing system of claim 1, wherein the one or more signals of interest include a wireless signal or a beacon signal.

3. The mobile computing system of claim 1, the operations further comprising utilizing a signal of interest from the one or more signals of interest to establish a connection with a device of a merchant and utilizing the established connection to make a payment to the merchant.

4. The mobile computing system of claim 1, wherein the series of tilt amounts of the mobile computing system correspond to one or more degrees of the tilts of the mobile computing system.

5. The mobile computing system of claim 1, wherein the first predetermined tilt pattern corresponds to a first velocity.

6. The mobile computing system of claim 1, the operations further comprising:
   determining, at a later time, that a tilt pattern of the mobile computing system at the later time corresponds to a second tilt pattern of the plurality of tilt patterns; and
   in response to the determining, at the later time, that the tilt pattern of the mobile computing system corresponds to the second tilt pattern, terminating the scanning power of the mobile computing system.

7. The mobile computing system of claim 6, wherein the second tilt pattern corresponds to a second velocity, and wherein the second velocity corresponds to a moving vehicle.

8. A method comprising:
   determining a tilt of a mobile device computing system;
   accessing a series of tilt amounts of the mobile computing system, wherein the series of tilt amounts corresponds to tilts detected by a tilt sensor;
   determining the tilt corresponds to a tilt pattern based on the series of tilt amounts of the mobile computing system;
   determining that the tilt pattern corresponds to a first predetermined tilt pattern of a plurality of tilt patterns;
   in response to the determining that the tilt pattern corresponds to the first predetermined tilt pattern of the plurality of tilt patterns, providing scanning power to cause a transceiver of the mobile computing system to scan an environment for one or more signals of interest; and
   identifying the one or more signals of interest from the scan of the environment.

9. The method of claim 8, wherein the one or more signals of interest include a wireless signal or a beacon signal.

10. The method of claim 8, further comprising:
   utilizing a signal of interest from the one or more signals of interest to establish a connection with a device of a merchant; and
   utilizing the established connection to make a payment to the merchant.

11. The method of claim 8, wherein each tilt amount of the series of tilt amounts of the mobile computing system corresponds to a degree of tilt of the mobile computing system.

12. The method of claim 8, wherein the first predetermined tilt pattern corresponds to a first velocity.

13. The method of claim 8, further comprising:
   determining, at a later time, that a tilt pattern of the mobile computing system at the later time corresponds to a second tilt pattern of the plurality of tilt patterns; and
   in response to the determining, at the later time, that the tilt pattern of the mobile computing system corresponds to the second tilt pattern, causing the mobile computing system to terminate scanning for the one or more signals of interest.

14. The method of claim 13, wherein the second tilt pattern corresponds to a second velocity, and wherein the second velocity corresponds to a moving vehicle.

15. A non-transitory machine-readable storage medium, and program instructions stored on the non-transitory machine-readable storage medium that, when executed, cause a machine to perform operations comprising:
    determining a series of tilt amounts of a mobile computing system, wherein the series of tilt amounts corresponds to tilts detected by a tilt sensor;
    determining a tilt pattern based on the series of tilt amounts of the mobile computing system;
    determining that the tilt pattern corresponds to a first predetermined tilt pattern of a plurality of tilt patterns;
    in response to the determining that the tilt pattern corresponds to the first predetermined tilt pattern of the plurality of tilt patterns, providing scanning power to cause a transceiver of the mobile computing system to scan an environment for one or more signals; and
    identifying the one or more signals from the scan of the environment.

16. The non-transitory machine-readable storage medium of claim 15, wherein the one or more signals include a wireless signal or a beacon signal.

17. The non-transitory machine-readable storage medium of claim 15, the operations further comprising:
    utilizing a signal from the one or more signals to establish a connection with a device of a merchant; and
    utilizing the established connection to make a payment to the merchant.

18. The non-transitory machine-readable storage medium of claim 15, wherein each tilt amount of the series of tilt amounts of the mobile computing system corresponds to a degree of tilt of the mobile computing system.

19. The non-transitory machine-readable storage medium of claim 15, the operations further comprising:
    determining, at a later time, that a tilt pattern of the mobile computing system at the later time corresponds to a second tilt pattern of the plurality of tilt patterns; and
    in response to the determining, at the later time, that the tilt pattern of the mobile computing system corresponds to the second tilt pattern, terminating the scanning power of the mobile computing system.

20. The non-transitory machine-readable storage medium of claim 15, wherein the first predetermined tilt pattern comprises a threshold tilt degree and a threshold tilt number, and wherein the determining that the tilt pattern corresponds to the first predetermined tilt pattern of the plurality of tilt patterns comprises:
    determining a number of tilt amounts, of the series of tilt amounts, that have a tilt degree exceeding the threshold tilt degree of the first predetermined tilt pattern; and
    determining that the determined number of tilt amounts exceeds the threshold tilt number of the first predetermined tilt pattern.

\* \* \* \* \*